US012718472B2

(12) United States Patent
Michel et al.

(10) Patent No.: US 12,718,472 B2
(45) Date of Patent: Aug. 25, 2026

(54) RELIGHTABLE SCENE RECONSTRUCTIONS USING RADIANCE GUIDED MATERIAL EXTRACTION

(71) Applicant: Adobe Inc., San Jose, CA (US)

(72) Inventors: Élie Louis Simon Michel, Paris (FR); Julien Olivier Victor Philip, London (GB); Diego Andre Gomez Mijangos, Paris (FR); Adrien Michel Paul Kaiser, Lyons (FR)

(73) Assignee: Adobe Inc., San Jose, CA (US)

( * ) Notice: Subject to any disclaimer, the term of this patent is extended or adjusted under 35 U.S.C. 154(b) by 266 days.

(21) Appl. No.: 18/639,346

(22) Filed: Apr. 18, 2024

(65) Prior Publication Data

US 2025/0329106 A1 Oct. 23, 2025

(51) Int. Cl.

| | |
|---|---|
| ***G06T 15/55*** | (2011.01) |
| ***G06T 15/04*** | (2011.01) |
| ***G06T 15/20*** | (2011.01) |
| ***G06T 15/50*** | (2011.01) |

(52) U.S. Cl.
CPC .............. *G06T 15/55* (2013.01); *G06T 15/04* (2013.01); *G06T 15/205* (2013.01); *G06T 15/506* (2013.01); *G06T 2215/12* (2013.01)

(58) Field of Classification Search
None
See application file for complete search history.

(56) References Cited

PUBLICATIONS

Thies et al., "Image-Guided Neural Object Rendering", 2020. (Year: 2020).*
Azinovic , et al., "Inverse Path Tracing for Joint Material and Lighting Estimation", In Proceedings of the IEEE/CVF conference on computer vision and pattern recognition, 2019, pp. 2447-2456.
Chen , et al., "TensoRF: Tensorial Radiance Fields", In European Conference on Computer Vision, 2022, pp. 333-350.
Gortler , et al., "The Lumigraph", ACM Trans. Graph., 43-54, 1996, 1996, pp. 43-54.
Hasselgren , et al., "Appearance-driven automatic 3d model simplification", In EGSR (DL), 2021, pp. 85-97.
Jambon , et al., "NeRFshop: Interactive Editing of Neural Radiance Fields", Proceedings of the ACM on Computer Graphics and Interactive Techniques 6, 1, May 2023, 20 pages.
(Continued)

*Primary Examiner* — Nicholas R Wilson
(74) *Attorney, Agent, or Firm* — FIG. 1 Patents

(57) ABSTRACT

Techniques for relightable scene reconstructions using radiance guided material extraction are described to accurately render 3D scenes under different lighting conditions and perspectives than original source images from which the scenes are constructed. In an example, a processing device is operable to receive a plurality of digital images that depict a scene from multiple perspectives, determine a view-independent radiance of the scene based on the plurality of digital images, and determine a view-dependent radiance of the scene based on the plurality of digital images. The processing device is further operable to determine a set of lighting conditions associated with an input perspective, generate a synthesized image having a reconstruction of the scene based on the set of lighting conditions using the view-independent radiance and the view-dependent radiance, and output the synthesized image.

20 Claims, 11 Drawing Sheets

(56) References Cited

PUBLICATIONS

Jin , et al., “TensoIR: Tensorial Inverse Rendering”, In Proceedings of the IEEE/CVF Conference on Computer Vision and Pattern Recognition (CVPR), Jun. 2023, pp. 165-174.
Kerbl , et al., “3D Gaussian Splatting for Real-Time Radiance Field Rendering”, ACM Transactions on Graphics 42, 4, Jun. 2023, 14 pages.
Levoy , et al., “Light Field Rendering”, ACM Trans. Graph., 31-42, 1996, 1996, pp. 31-42.
Li , et al., “NERFACC: A General NERF Acceleration Toolbox”, Cornell University, arXiv preprint arXiv:2210.04847, retrieved from the internet on Jul. 10, 2024, <https://browse.arxiv.org/pdf/2210.04847v3>, May 10, 2023, 6 pages.
Loshchilov, Ilya , et al., “Decoupled Weight Decay Regularization”, Cornell University arXiv, arXiv.org [retrieved Aug. 9, 2023]. Retrieved from the Internet <https://arxiv.org/pdf/1711.05101.pdf>., Jan. 4, 2019, 19 Pages.
Mai , et al., “Neural Microfacet Fields for Inverse Rendering”, In Proceedings of the IEEE/CVF International Conference on Computer Vision (ICCV), Oct. 2023, pp. 408-418.
Martel, Julien , et al., “ACORN: Adaptive Coordinate Networks for Neural Scene Representation”, Cornell University arXiv, arXiv.org [retrieved Mar. 16, 2023]. Retrieved from the Internet <https://arxiv.org/pdf/2105.02788.pdf>., May 6, 2021, 18 Pages.
Mildenhall, Ben , et al., “NeRF: Representing Scenes as Neural Radiance Fields for View Synthesis”, Cornell University arXiv, arXiv.org [retrieved Mar. 19, 2023]. Retrieved from the Internet <https://arxiv.org/pdf/2003.08934.pdf>., Aug. 3, 2020, 25 Pages.
Müller, Thomas , et al., “Instant Neural Graphics Primitives with a Multiresolution Hash Encoding”, Cornell University arXiv, arXiv.org [retrieved Mar. 19, 2023]. Retrieved from the Internet <https://arxiv.org/pdf/2201.05989.pdf>., May 4, 2022, 15 Pages.
Sitzmann, Vincent , et al., “Implicit Neural Representations with Periodic Activation Functions”, Cornell University arXiv, arXiv. org [retrieved Dec. 10, 2021]. Retrieved from the Internet <https://arxiv.org/pdf/2006.09661.pdf>., Jun. 17, 2020, 35 Pages.
Srinivasan, Pratul P., et al., “NeRV: Neural Reflectance and Visibility Fields for Relighting and View Synthesis”, Cornell University arXiv, arXiv.org [retrieved Dec. 10, 2021]. Retrieved from the Internet <https://arxiv.org/pdf/2012.03927.pdf>., Dec. 7, 202, 12 Pages.
Tancik, Matthew , et al., “Fourier Features Let Networks Learn High Frequency Functions in Low Dimensional Domains”, Cornell University arXiv, arXiv.org [retrieved Aug. 9, 2023]. Retrieved from the Internet <https://arxiv.org/pdf/2006.10739.pdf>., Jun. 18, 2020, 24 Pages.
Toshi , et al., “ReLight My NeRF: A Dataset for Novel View Synthesis and Relighting of Real World Objects”, In Proceedings of the IEEE/CVF Conference on Computer Vision and Pattern Recognition (CVPR), Jun. 2023, pp. 20762-20772.
Veach, Eric , et al., “Optimally Combining Sampling Techniques for Monte Carlo Rendering”, Proceedings of the 22nd Annual Conference on Computer Graphics and Interactive Techniques, 1995, 10 pages.
Verbin , et al., “Eclipse: Disambiguating Illumination and Materials using Unintended Shadows”, Cornell University, arXiv.org., retrieved from the internet on Jul. 10, 2024, <https://arxiv.org/pdf/2305.16321>, 2023, 17 pages.
Verbin , et al., “Ref-NeRF: Structured View-Dependent Appearance for Neural Radiance Fields”, In 2022 IEEE/CVF Conference on Computer Vision and Pattern Recognition (CVPR), 2022, pp. 5481-5490.
Wang, Zhou , et al., “Image Quality Assessment: From Error Visibility to Structural Similarity”, IEEE Transactions on Image Processing, vol. 13, No. 4 [retrieved Jan. 30, 2023]. Retrieved from the Internet <http://www.cns.nyu.edu/pub/lcv/wang03-preprint.pdf>., Apr. 2004, 14 pages.
Xu , et al., “ReNeRF: Relightable Neural Radiance Fields with Nearfield Lighting”, In Proceedings of the IEEE/CVF International Conference on Computer Vision (ICCV), Oct. 2023, pp. 22581-22591.
Yifan , et al., “Differentiable Surface Splatting for Point-based Geometry Processing”, ACM Transactions on Graphics (proceedings of ACM SIGGRAPH ASIA) 38, 6, 2019, 14 pages.
Yuan , et al., “NeRF-Editing: Geometry Editing of Neural Radiance Fields”, In Proceedings of the IEEE/CVF Conference on Computer Vision and Pattern Recognition, 2022, pp. 18353-18364.
Zhang , et al., “Modeling Indirect Illumination for Inverse Rendering”, In Proceedings of the IEEE/CVF Conference on Computer Vision and Pattern Recognition, 2022, pp. 18643-18652.
Zhang, Xiuming , et al., “NeRFactor: Neural Factorization of Shape and Reflectance Under an Unknown Illumination”, Cornell University arXiv, arXiv.org [retrieved Dec. 13, 2021]. Retrieved from the Internet <https://arxiv.org/pdf/2106.01970.pdf>., Jun. 3, 2021, 17 Pages.
Zhang, Richard , et al., “The Unreasonable Effectiveness of Deep Features as a Perceptual Metric”, Cornell University arXiv, arXiv.org [retrieved Aug. 11, 2023]. Retrieved from the Internet <https://arxiv.org/pdf/1801.03924.pdf>., Apr. 10, 2018, 14 Pages.

* cited by examiner

RELIGHTABLE SCENE RECONSTRUCTIONS USING RADIANCE GUIDED MATERIAL EXTRACTION

BACKGROUND

View synthesis is a computer graphics technique for generating two-dimensional (2D) images of three-dimensional (3D) scenes extracted from a limited set of 2D perspectives. Conventional techniques and systems used to perform view synthesis, however, are confronted with numerous technical challenges that results in visual inaccuracies that are readily detectable by a human that views these two-dimensional (2D) images.

SUMMARY

Techniques are described for generating relightable scene reconstructions using radiance guided material extraction to accurately render 3D scenes, including under different lighting conditions. These techniques enable realistic material properties and geometry to be extracted independent from environmental lighting conditions captured in digital images. Synthesized images generated in accordance with the described techniques accurately depict complex lighting behavior, including for scenes that have highly diffuse or glossy regions.

In an example, a processing device is operable to receive a plurality of digital images that depict a scene from multiple perspectives, determine a view-independent radiance of the scene based on the plurality of digital images, and determine a view-dependent radiance of the scene based on the plurality of digital images. The processing device is further operable to determine a set of lighting conditions associated with an input perspective, generate a synthesized image having a reconstruction of the scene based on the set of lighting conditions using the view-independent radiance and the view-dependent radiance, and output the synthesized image.

In some examples, a processing device is operable to receive a plurality of digital images that depict a scene from multiple perspectives and generate a Laplacian pyramid environment map structure that encodes lighting conditions of the scene. The processing device is further operable to determine a radiance of the scene based on the lighting conditions encoded within the Laplacian pyramid environment map structure, generate a synthesized image having a reconstruction of the scene using the radiance, and output the synthesized image.

In another example, a system includes a memory component, and a processing device coupled to the memory component to perform operations that include determining a view-independent radiance of a scene from a plurality of digital images that depict the scene from multiple perspectives, supervising a diffuse radiance output for a reconstruction of the scene using the view-independent radiance, determining a view-dependent radiance of the scene based on the plurality of digital images, and supervising a specular radiance output for the reconstruction using the view-independent radiance. The operations further include generating a synthesized image from the reconstruction using the diffuse radiance and the specular radiance.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRA WINGS

The detailed description is described with reference to the accompanying figures. Entities represented in the figures are indicative of one or more entities and thus reference is made interchangeably to single or plural forms of the entities in the discussion.

DETAILED DESCRIPTION

Overview

Figure 1:
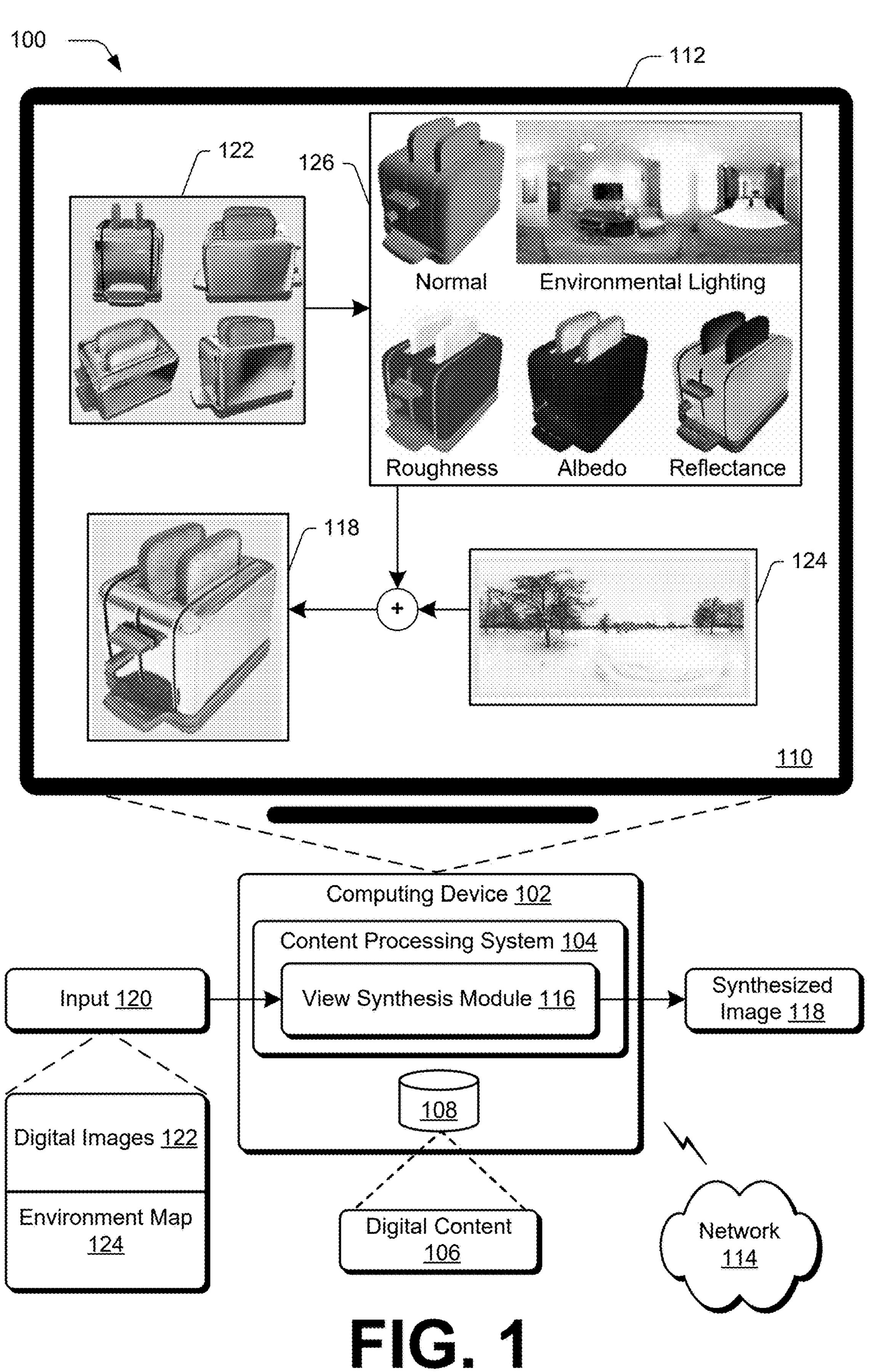
FIG. 1 is an illustration of a digital medium environment in an example implementation that is operable to employ techniques described herein for generating relightable scene reconstructions using radiance guided material extraction.

View synthesis is a computer graphics technique for generating two dimensional (2D) images of three dimensional (3D) scenes extracted from a limited set of 2D perspectives. Conventional view synthesis techniques apply neural representations of light fields to acquire 3D data from 2D digital images. Some view synthesis models can generate perspectives under various lighting conditions. Existing view synthesis models and techniques, however, have difficulty rendering some complex scenes, such as, scenes depicting highly glossy or highly diffused materials and surfaces.

Accordingly, techniques and systems for generating relightable scene reconstructions using radiance guided material extraction are described to accurately render 3D scenes, including under different lighting conditions and perspectives than original source images from which the scenes are reconstructed. In an example, a view synthesis model is described that receives, as input, a set of 2D digital images taken of a single 3D scene under a given set of lighting conditions, with each from derivable perspectives or view directions. Based on the digital images, the view synthesis model determines parameters that define a scene reconstruction.

The reconstruction enables renderings of different view directions or different perspectives of the 3D scene, including under different lighting conditions (e.g., from an environment map input). For example, the view synthesis model includes multiple neural radiance fields operable to generate a precise representation of a 3D scene based on the 2D images received as input. These representations are encoded in the view synthesis model to using tensor representations that factorize each scene tensor into compact low-rank components to improve rendering quality and processing efficiency. For example, the representations are encoded to be compact and efficiently optimized based on techniques described in "TensoRF: Tensorial Radiance Fields" by Anpei Chen et al, as published in European Conference on Computer Vision (2022), 532 Springer, pp. 333-350.

The view synthesis model is trained to learn physically based information from the 2D digital images by performing inverse rendering based on tensor factorization and neural fields that estimate scene geometry and material properties, surface reflectance, and extract environment illumination. For example, the view synthesis model uses a dual rendering process that is based on techniques described in "TensoIR: Tensorial Inverse Rendering" by Haian Jin et al, as published in Proceedings of the IEEE/CVF Conference on Computer Vision and Pattern Recognition (CVPR) (June 2023), pp. 165-174. The neural radiance fields supervise separate diffuse and view-dependent components of a physically based module that generates the 3D scene representation. For example, a radiance module is implemented by the neural radiance fields to isolate view-dependent effects from view-independent effects determined for the representation. The radiance module helps train the view synthesis model by determining an initial (e.g., coarse) estimate of the geometry of the scene. This neural radiance field supervision and coarse initialization causes the physically based module to extract accurate data describing materials, geometry, and environment lighting conditions from the 2D digital images.

The radiance module and the other neural networks are configurable to collaborate with the physically based module to determine complex information in the scene. For example, scene geometry is disentangled from materials and original lighting conditions, such that the scene geometry is differentially renderable from a variety of perspectives. In an implementation, the physically based module is configured to estimate from the input images, material, and fine geometry information by leveraging a physically aware sampling algorithm. For example, the physically based module uses Multiple Importance Sampling (MIS) to determine complex behavior of indirect lighting on glossy parts of scenes depicted in the digital images. The MIS enables the physically based module to feed an expressive environment map structure (e.g., an environment light structure) to enable view synthesis of different perspectives of the 3D scene. For example, instead of a Spherical Gaussian representation, the sampling algorithm queries form a Laplacian pyramid based environment map structure to define the lighting behavior.

Laplacian pyramids are image representations that include octave-spaced image representations that are band-pass filtered, in addition to having a low-frequency image representation or residual. Laplacian pyramids enable image representations that convey detailed or high-frequency (e.g., band-passed) components separately from less detailed or low-frequency residual portions. Optimizing the environment lighting extracted from input images using the Laplacian pyramid based expressive environment map structure achieves an overall higher quality representation of the environmental lighting extracted from the input images.

Accordingly, the view synthesis techniques described herein facilitate generation of higher-fidelity representations of 3D scenes than conventional view synthesis models. Some complex scenes are not renderable with a high degree of realism using existing view synthesis models and techniques. Whereas the view synthesis techniques described herein enable accurate rendering and illumination of FIG. 1 complex materials and surfaces, including those with highly diffused or highly glossy characteristics.

Further discussion of these and other examples and advantages are included in the following sections and shown using corresponding figures. In the following discussion, an example environment is described that employs the techniques described herein. Example procedures are also described that are performable in the example environment as well as other environments. Consequently, performance of the example procedures is not limited to the example environment and the example environment is not limited to performance of the example procedures.

Example Relightable Scene Reconstruction Environment

FIG. 1 is an illustration of a digital medium environment 100 in an example implementation that is operable to employ techniques described herein for generating relightable scene reconstructions using radiance guided material extraction. The illustrated environment 100 includes a computing device 102, which is configurable in a variety of ways.

The computing device 102, for instance, is configurable as a processing device such as a desktop computer, a laptop computer, a mobile device (e.g., assuming a handheld configuration such as a tablet or mobile phone), and so forth. Thus, the computing device 102 ranges from full resource devices with substantial memory components and processor resources (e.g., personal computers, game consoles) to a low-resource device with limited memory and/or processing resources (e.g., mobile devices). Additionally, although a single computing device 102 is shown, the computing device 102 is also representative of a plurality of different devices (e.g., a computing system), such as multiple servers utilized by a business to perform operations "over the cloud" as described in FIG. 12.

The computing device 102 is illustrated as including a content processing system 104. The content processing system 104 is implemented at least partially in hardware of the computing device 102 to process and transform digital content 106, which is illustrated as maintained in storage 108 of the computing device 102. Such processing includes creation of the digital content 106, modification of the digital content 106, and rendering of the digital content 106 in a user interface 110 for output, e.g., by a display device 112. Although illustrated as implemented locally at the computing device 102, functionality of the content processing system 104 is also configurable in whole or in part through functionality available via the network 114, such as part of a web service or "in the cloud".

An example of functionality incorporated by the content processing system 104 to process the digital content 106 is illustrated as a view synthesis module 116. The view synthesis module 116 is configured to generate a synthesized image 118 based on an input 120 that includes a plurality of digital images 122. Original lighting conditions are extracted from the images 122. New lighting conditions are defined by an environment map 124 received as part of the input 120. Generally, the digital images 122 are 2D pictures that capture different perspectives of a same 3D scene, e.g., one or more 3D rendered objects, one or more real-world objects. The new lighting conditions specified by the environment map 124 drive illuminance characteristics later applied to a rendering of the 3D scene when generating the synthesized image 118.

In the illustrated example, the view synthesis module 116 receives the digital images 122, which depict a metallic toaster from different perspectives, under a set of original lighting conditions. The toaster is illuminated in the digital images 122 by a directional light source defined by the original lighting conditions, which cause reflections to appear on the toaster's metallic surfaces.

The view synthesis module 116 also receives the environment map 124 including an indication of desired lighting conditions, which in this example includes a target lighting condition of ambient lighting from an outside, winter weather environment. Based on the digital images 122 and the environment map 124, the view synthesis module 116 is operable to generate the synthesized image 118 to present the toaster from a particular view direction (e.g., perspective showing an arbitrary orientation) given the new target lighting conditions. For instance, the toaster is depicted with surface reflections that mirror the ambient lighting from the outside, winter weather environment defined by the environment map 124.

As illustrated, the view synthesis module 116 generates the synthesized image 118 to preserve fine details of an object surface depicted in the digital images 122 (e.g., subtle contours and shapes of the toaster), while including congruous lighting conditions reflecting the ambient lighting from the metallic surfaces. Intrinsic properties 126 of surfaces conveyed by the digital images 122 are extracted by the view synthesis module 116. From estimating radiance characteristics defined by the intrinsic properties 126, the lighting applied to the toaster is consistent and realistic to the way the new lighting conditions of the environment map 124 reflect off the metallic surfaces. This is not possible using conventional techniques, which fail to account for luminescence behavior of the toaster being caused by the intrinsic properties 126 when the toaster is exposed to different lighting conditions than the original lighting conditions depicted in the digital images 122. The techniques described herein further overcome limitations of conventional techniques that are computationally expensive and/or fail to replicate the mirroring effects of the highly reflective or highly diffused object surfaces. Further discussion of these and other advantages is included in the following sections and shown in corresponding figures.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Radiance Guided Material Extraction

The following discussion describes techniques that are implementable utilizing the previously described systems and devices. Aspects of each of the procedures are implemented in hardware, firmware, software, or a combination thereof. The procedures are shown as a set of blocks that specify operations performed by one or more devices and are not limited to the orders shown for performing the operations by the respective blocks.

Figure 2:
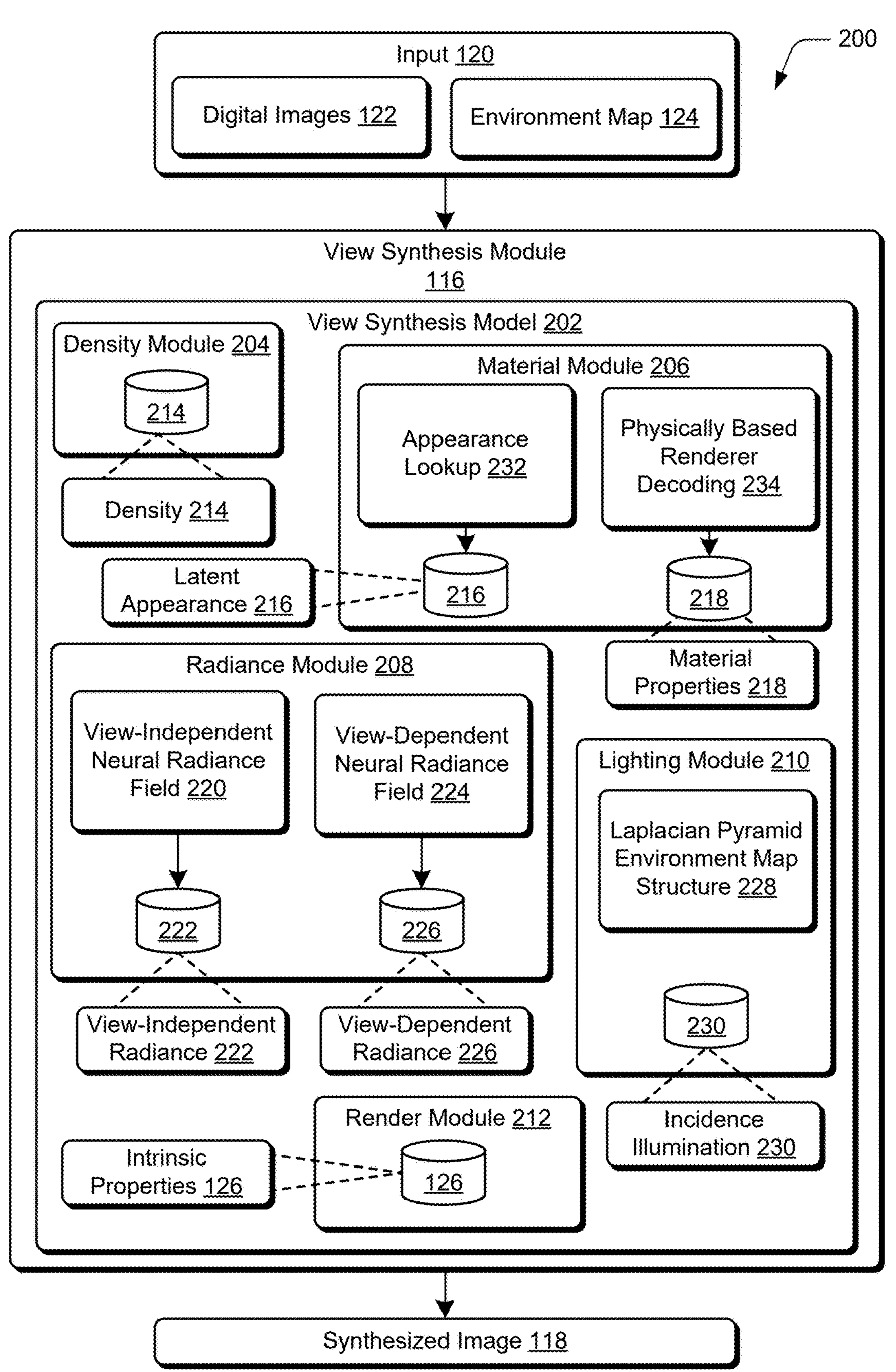
FIG. 2 depicts a system as an example implementation of a view synthesis model that is operable to employ techniques described herein for generating relightable scene reconstructions using radiance guided material extraction.

FIG. 2 depicts a system 200 as an example implementation of the view synthesis module 116 that is operable to employ techniques described herein for generating relightable scene reconstructions using radiance guided material extraction. Generally, the view synthesis module 116 is operable to extract the intrinsic properties 126 of a 3D scene depicted in the digital images 122 and later apply the lighting conditions of the environment map 124 to the intrinsic properties 126 to generate the synthesized image 118 from a different perspective and different lighting conditions than the perspectives and lighting conditions of the digital images 122.

As shown in FIG. 2, the view synthesis module 116 includes a view synthesis model 202 that is operable to receive the digital images 122 and the target lighting conditions defined by the environment map 124 as inputs. The view synthesis model 202 includes trained parts that are machine-learned models and untrained parts that are traditional (e.g., non-machine-learned) computer models. From these inputs, the view synthesis model 202 is operable to generate the synthesized image 118 for output from the view synthesis module 116 (e.g., for display in the user interface 110).

The digital images 122 include individual pictures that show different perspectives of a same 3D scene. While in this example the digital images 122 are depicted as a collection of 2D pictures, in other examples, the digital images 122 are representative of various other types of the digital content 106, such as a digital video, augmented-reality/virtual-reality content, etc. The 3D scene conveyed in the digital images 122 may include real-world subjects, and in other examples, the 3D scene depicted therein includes computer-simulated (e.g., rendered) objects, such as objects of a gaming environment.

Generally, the environment map 124 represents an image input that indicates one or more lighting conditions or light sources to be applied by the view synthesis module 116 during rendering of 3D objects in the synthesized image 118. In an example, the environment map 124 is received as a user selection such as by selecting predefined options, a reference image input, or other form of data. The environment map 124 may be generated automatically and without user intervention based on a reference image, which may be distinct from each of the digital images 122. For instance, the environment map 124 is generated to include a lighting condition and a background condition present in a reference image.

The view synthesis model 202 includes multiple parts, some of which are trainable (and re-trainable) via machine-learning techniques, and others that are not trainable but rather, preprogrammed or preconfigured to perform specific operations and functions without relying on machine-learning. The learnable components are interconnected through multiple differentiable fixed-function modules. The view synthesis model 202 uses material properties 218 and a Laplacian pyramid environment map structure 228 as estimates of the intrinsic properties 126 of objects and material surfaces in a 3D scene depicted in the digital images 122. The intrinsic properties 126 (e.g., the material properties 218 and the Laplacian pyramid environment map structure 228) are used to define a reconstruction for rendering the synthesized image 118 to include different perspectives of the 3D scene. When the environment map 124 is received as input, the material properties 218 and the environment map 124 are used for rendering under the different lighting conditions specified by the environment map 124.

FIG. 1

A first learnable component of the view synthesis model 202 includes a density module 204. The density module 204 includes a neural network that is operable to learn a density 214 on a geometry estimated from the 3D scene depicted in the digital images 122. The neural network of the density module 204 is overfit trained based on the digital images 122 to assign a density 214 $\sigma$ to an input position located in the 3D scene. The density module 204 receives a position in the 3D scene as input and predicts a density 214 $\sigma$ corresponding to the input position. The density 214 $\sigma$ predicted by the density module 204 indicates whether the corresponding input position represents free space (e.g., no identifiable objects or materials depicted by the digital images 122) or a material surface (e.g., at least one physical object or surface depicted in the digital images 122).

In some implementations, the neural network of the density module 204 encodes a 3D scalar field of the geometry in the 3D scene using the TensoRF representation. Encoding this way enables the neural network of the density module 204 to perform efficient raytracing and achieve overfitting during training with less time than other models. In one or more examples, a Vector-Matrix (VM) factorization is used by the density module 204 to cause higher rendering quality than is achievable using other low rank tensorial factorizations (e.g., as described in TensorRF). For each quantity s, the grid $\mathcal{G}$s designates a 3D field associating a quantity $s_x=\mathcal{G}_s(x)$ to each position $x\in R^3$. This association is done through bilinear interpolation of the grid values. The density module 204 encodes the 3D density tensor $\mathcal{G}_\sigma$ using the following decomposition:

$$\mathcal{G}_\sigma = \sum_k \sum_{m\in XYZ} v^m_{\sigma,m} \circ M^{\tilde{m}}_{\sigma,k} \quad (1)$$

In the above, $$v^m_{\sigma,k},\ M^{\tilde{m}}_{\sigma,k}$$

is the k-th learnable Vector-Matrix factor associated to the spatial axes m. The term m represents the corresponding complementary axes (e.g., $\tilde{X}$=YZ). From this scalar field, the density module 204 predicts the density 214 ($\sigma_x$) at a given 3D location x as:

$$\sigma_x = \mathcal{G}_\sigma(x) \quad (2)$$

A second learnable component is a material module 206. The material module 206 includes two parts: an appearance lookup 232 that is operable to encode a latent appearance 216 and a physically based renderer decoding neural network 234 that is operable to extract material properties 218 from the 3D scene depicted in the digital images 122. As described below, this two-stage approach of the material module 206 enables a radiance module 208 of the view synthesis model 202 be guided by the latent appearance 216 so the radiance module 208 does not have to wait to learn a full mapping from the material properties 218.

In some implementations, the material module 206 configures the appearance lookup 232 to be a 3D scalar field using the TensoRF representation. The material module 206 receives a sample location as input and performs a look-up in this material tensor $\mathcal{G}_\alpha$ to determine the latent appearance 216 for that location. The appearance lookup 232 outputs the latent appearance 216. Following the look-up of the latent appearance 216, the neural network 234 of the material module 206 decodes the latent appearance 216 into the material properties 218.

The neural network 234 is overfit trained based on the digital images 122 to extract the material properties 218 associated with material surfaces depicted from the digital images 122, including for glossy and diffuse scenes. Overfitting the neural network 234 based on the digital images 122 causes the material model 206 to be trained to determine the latent appearance 216 and the material properties 218 associated with spatial locations within the scene. The material module 206 encodes the material properties 218 in a 3D field that is agnostic to original lighting conditions of the digital images 122. The material properties 218 are used to characterize a bidirectional scattering distribution function (BSDF) model of the render module 212 to generate a reconstruction of the 3D scene depicted in the digital images 122.

Some examples of the material properties 218 extracted by the neural network 234 include a surface normal property $n_x$, an albedo property $\gamma_x$, a reflectance property $F_{0,x}$, and a roughness property $\rho_x$. The material properties 218 include additional or fewer types of material properties in other implementations.

The normal property $n_x$ represents a vector that is normal to a material surface at an input position and is useful for inferring orientation of a surface within the 3D scene. The albedo property $\gamma_x$ represents a base color of a material surface at the input position when that surface is not being illuminated by a light source. The reflectance property $F_{0,x}$ indicates a specular reflectance characteristics of the material surface at the input position. The reflectance property is used to estimate specular effects of simulated lighting applied to a corresponding object (e.g., a low reflectance is associated with dull or diffused surfaces, a high reflectance is associated with shiny or glossy surfaces). The roughness property $\rho_x$ defines a degree of smoothness associated with the material surface at the input position (e.g., a low roughness indicates the surface is smooth, a high roughness indicates the surface is coarse).

The material properties 218 are evaluated at each step of the raytracing, including being weighted by the density 214, and integrated along the ray. When the density 214 being accumulated reaches a threshold, the material properties 218 are input to the render module 212. The material properties 218 extracted by the neural network 234 are used as inputs to the render module 212 for generating a physics based reconstruction of the 3D scene, which is used to render the view synthesis image 118 to depict the 3D scene from a particular view direction, including in one or more examples, rendering under the lighting conditions defined by the environment map 124.

A third learnable component includes a lighting module 210. The lighting module 210 encodes incidence effects for the 3D scene and outputs incidence illumination 230. The incidence illumination 230 is retrieved during rendering to accurately illuminate surfaces and objects of a scene. In an example, the lighting module 210 manages creation and utilization of a Laplacian pyramid environment map structure 228, which is trained to encode environment lighting characteristics extracted from the digital images 122. The Laplacian pyramid environment map structure 228 is an expressive environment map enabling lighting characteristics to be applied to the reconstruction of the 3D scene. The Laplacian pyramid environment map structure 228 is replaced by the environment map 124 when rendering for new lighting conditions, which are different from the original lighting conditions represented by the Laplacian pyramid environment map structure 228. The lighting module 210 queries the radiance module 208 for determining the incidence illumination 230 applied to objects in the scene. The lighting module 210 and the Laplacian pyramid environment map structure 228 are described in greater detail with reference to FIG. 6.

A fourth learnable component is a radiance module 208. The radiance module 208 includes multiple neural radiance fields that are operable to determine pre-integrated light information for reconstructing the 3D scene. The radiance module 208 includes a view-independent neural radiance field 220 operable to encode a view-independent radiance 222, and a view-dependent neural radiance field 224 that is operable to encode a view-dependent radiance 226. The radiance module 208 is responsible for driving optimization of the density module 204, the material module 206, and the lighting module 210. In one or more examples, the radiance module 208 is not used outside training the view synthesis model 202, e.g., when rendering the scene for the lighting conditions of the environment map 124 received from the input 120.

In some examples, the radiance module 208 directs the training of the view synthesis model 202 to learn the intrinsic properties 126 for the render module 212. In particular, the outputs of the radiance module 208 are used to supervise corresponding outputs of the render module 212. The radiance module 208 supervises a loss function at an output of the render module 212 based the view-independent radiance 222 and the view-dependent radiance 226. Supervising the loss function configures the render module 212 to accurately generate the reconstruction of the scene depicted in the digital images 122. A more accurate reconstruction enables the render module 212 to correctly apply illuminations to the scene when rendering the synthesized image 118 under the set of lighting conditions defined by the Laplacian pyramid environment map structure 228 or the environment map 124. The radiance module 208 is described in greater detail with respect to FIG. 3.

A non-learnable component of the view synthesis model 202 includes a render module 212. The render module 212 executes physically based rendering tasks to turn the intrinsic properties 126 into radiance for illuminating a rendered 3D scene. The render module 212 obtains local irradiance information (e.g., the incidence illumination 230) from the lighting module 210 to estimate a 3D scene illumination. The render module 212 includes a tone mapping module that maps these linear radiance values into a color space derived from the digital images 122.

The render module 212 is operable to implement a physically based 3D rendering pipeline. The render module 212 generates a reconstruction (e.g., a physics based model) of the scene depicted in the digital images 122. For rendering under new lighting conditions, the lighting conditions specified by the environment map 124 are applied to the reconstruction as the render module 212 renders the synthesized image 118. The render module 212 uses information inferred from the outputs of the density module 204, the material module 206, the radiance module 208, and the lighting module 210 to generate the reconstruction. For example, the render module 212 receives a view direction input, along with the material properties 218 extracted by the material module 206, and the density 214 estimated by the density module 204. By querying the lighting module 210, the render module 212 applies lighting characteristics to the reconstruction to cause an appearance of the scene depicted in the digital images 122. The render module 212 produces the synthesized image 118 for depicting the scene under the lighting conditions specified by the Laplacian pyramid environment map structure 228 or the environment map 124 and from a particular perspective.

As used herein, the term "machine-learning model" refers to a computer representation that is tunable (e.g., through training and retraining) based on inputs without being actively programmed by a user to approximate unknown functions, automatically and without user intervention. In particular, the term machine-learning model includes a model that utilizes algorithms to learn from, and make predictions on, known data by analyzing training data to learn and relearn to generate outputs that reflect patterns and attributes of the training data. Examples of machine-learning models include neural networks, convolutional neural networks (CNNs), long short-term memory (LSTM) neural networks, generative adversarial networks (GANs), decision trees, support vector machines, linear regression, logistic regression, Bayesian networks, random forest learning, dimensionality reduction algorithms, boosting algorithms, deep learning neural networks, etc.

In the illustrated example, the machine-learning models of the view synthesis model 202 are configured using a plurality of layers having, respectively, a plurality of nodes. The plurality of layers are configurable to include an input layer, an output layer, and one or more hidden layers. Calculations are performed by the nodes within the layers via hidden states through a system of weighted connections that are "learned" during training and retraining of the machine-learning model to implement a variety of tasks.

To train the machine-learning models of the view synthesis model 202, training data (e.g., the digital images 122) is received that provides examples of "what is to be learned" by that respective machine-learning model, i.e., as a basis to learn patterns from the data. The machine-learning models of the view synthesis model 202, for instance, collects and preprocesses the digital images 122 as training data that includes input features and corresponding target labels, i.e., of what is exhibited by the input features. The view synthesis model 202 then initialize parameters of its machine-learning models, which are used as internal variables to represent and process information during training and represent interferences gained through training. In an implementation, the training data for the machine-learning models described herein is separated into batches to improve processing and optimization efficiency of the parameters during training.

Training data is then received as an input by each machine-learning model of the view synthesis model 202 and used as a basis for generating predictions based on a current state of parameters of layers and corresponding nodes, a result of which is output as output data. Output data describes an outcome of the task, e.g., as a probability of being a member of a particular class in a classification scenario.

Training of the machine-learning models described herein includes calculating a loss function to quantify a loss associated with operations performed by nodes of the machine-learning models. The calculating of the loss function, for instance, includes implementing functions for comparing a difference between predictions specified in the output data with target labels specified by the training data. The loss function is configurable in a variety of ways, examples of which include regret, Quadratic loss function as part of a least squares technique, and so forth.

Calculation of the loss function also includes use a backpropagation operation as part of minimizing the loss function and thereby training parameters of the machine-learning model. Minimizing the loss function, for instance, includes adjusting weights of the nodes to minimize the loss and thereby optimize performance of the machine-learning model in performance of a particular task. The adjustment is determined by computing a gradient of the loss function, which indicates a direction to be used to adjust the parameters to minimize the loss. The parameters of the machine-learning models of the view synthesis model 202 are then updated based on the computed gradient.

This process continues over a plurality of iterations in an example until the view synthesis model 202 determines that a stopping criterion is met. The stopping criterion is employed by the machine-learning models in this example to promote overfitting of one or more of the machine-learning models, reduce computational resource consumption, and/or promote an ability of the machine-learning models to address previously unseen data, i.e., that is not included specifically as an example in the training data. Examples of a stopping criterion include but are not limited to a predefined number of epochs, validation loss stabilization, achievement of a performance improvement threshold, or based on performance metrics such as precision and recall. While overfitting of machine-learning models is often undesirable, the neural networks of the view synthesis model 202 are overfit-trained to encode geometries and radiance effects for the specific 3D scene represented by the digital images 122. For example, the density module 204, the material module 206, and the radiance module 208 may be overfit trained based on the digital images 122 to recognize the intrinsic properties 126 of surfaces and objects in the 3D scene depicted in the input 120 of the digital images 122.

Radiance Isolation for View Synthesis

Figure 3:
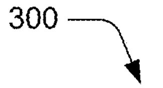
FIG. 3 depicts a system as an example implementation of a radiance module that is operable to isolate view-dependent radiance effects from view-independent radiance effects determined for relightable scene reconstructions generated using radiance guided material extraction.
Figure 3:
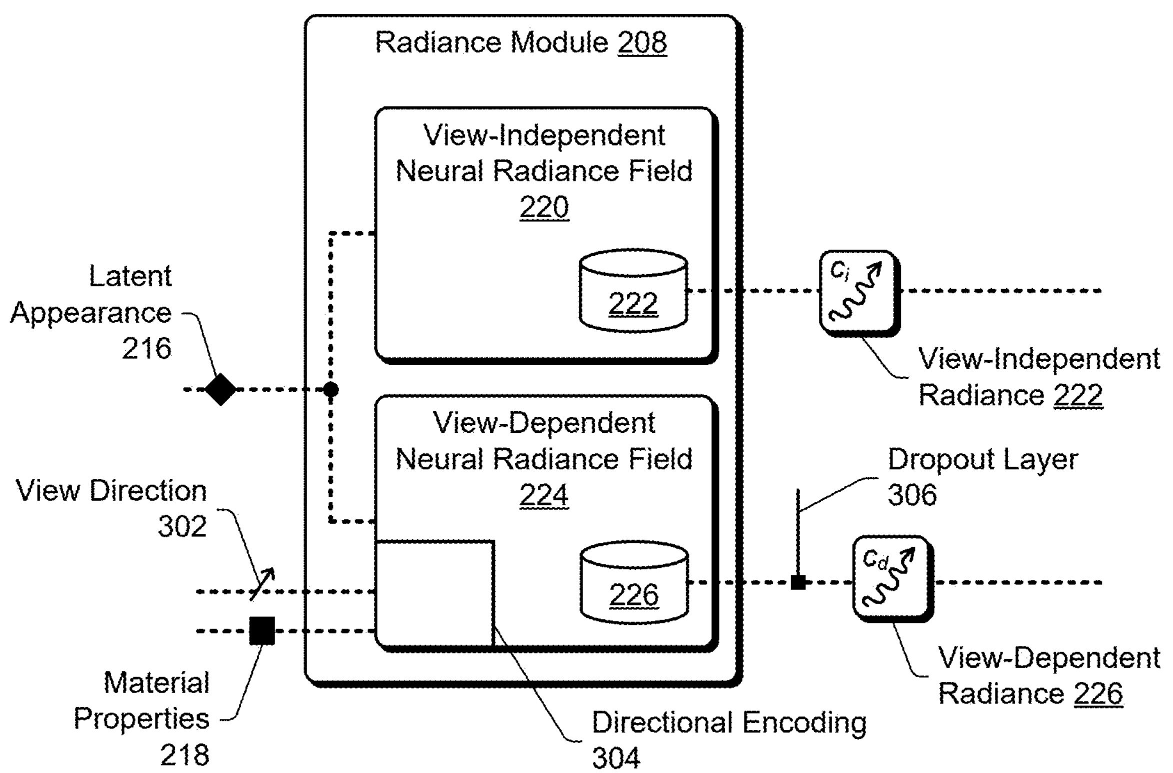

FIG. 3 depicts a system 300 as an example implementation of a radiance module that is operable to isolate view-dependent radiance effects from view-independent radiance effects determined for relightable scene reconstructions generated using radiance guided material extraction. For example, the system 300 includes the radiance module 208, which relies on two neural radiance fields to decompose radiance of a 3D scene depicted in the digital images 122 into view-dependent and view-independent effects.

The view-independent neural radiance field 220 outputs the view-independent radiance 222, and the view-dependent neural radiance field 224 generates the view-dependent radiance 226 for output. Decomposing the radiance of the 3D scene this way enables the view-dependent and view-independent visual features of the 3D scene to be isolated. With separate view-dependent and view-independent terms, individual diffuse and specular radiance outputs of the render module 212 are supervised, separately, which improves accuracy of the reconstruction.

The radiance module 208 receives the latent appearance 216 (e.g., a vector) generated by the material module 206 as an input. From the latent appearance 216, the view-independent radiance 222 is decoded from the latent appearance 216 by the view-independent neural radiance field 220. The view-dependent neural radiance field 224 decodes the view-dependent radiance 226 from the latent appearance 216, the material properties 218 inferred by the material module 206, and a view direction 302. The view direction 302 corresponds to a perspective, camera angle, or viewpoint into a reconstruction of a 3D scene.

The view-dependent radiance 226 may include a dropout layer 306. The dropout layer 306 helps to ensure that the view-dependent radiance 226 is decomposed to have a magnitude that is as high as possible.

A directional encoding 304 that is based on the material properties 218 is used by the view-dependent neural radiance field 224 in combination with the view direction 302 to improve the decomposition the view-dependent radiance 226. For example, the directional encoding 304 is based on techniques described in "Ref-NeRF: Structured view-dependent appearance for neural radiance fields" by Dor Verbin et al, as published in IEEE/CVF Conference on Computer Vision and Pattern Recognition (CVPR) (2022), IEEE, pp. 5481-5490. The directional encoding 304 enables the radiance module 208 to retrieve correct geometry and density of specular objects during decomposition of the view-dependent radiance 226.

As mentioned, the radiance module 208 does not receive an input position x to sample, instead, the radiance module 208 receives the latent appearance 216 from the material module 206. Like TensoIR, the radiance module 208 stores the latent appearance 216 in a TensoRF field, as defined below:

$$\mathcal{G}_a = \sum_k \sum_{m \in XYZ} v_{a,k}^m \circ M_{a,k}^{\tilde{m}} \circ b_k^m \tag{3}$$

The additional basis vectors $$b_k^m$$

express the multi-channel (e.g., RGB or Red Green Blue) nature of appearance. The latent appearance 216 at position x has a descriptor $a_x = \mathcal{G}_\alpha(x)$. The latent appearance 216 stores appearance information of the 3D scene depicted in the digital images 122. Coupling the radiance module 208 to the outputs of the material module 206 enables a tight supervision from the view-independent radiance 222 and the view-dependent radiance 226 onto the render module 212.

The decomposition of the view-independent radiance 222 from the view-dependent radiance 226 is enforced structurally by using different decoding networks for the view-independent radiance 222 (denoted as $c_i$) and the view-dependent radiance 226 (denoted as $c_d$):

$$c_i(x) = \mathcal{D}_{c_i}(a_x) \qquad (4)$$

$$c_d(x, d) = \mathcal{D}_{c_d}(a_x, d)$$

In the above, x are coordinates of a current sample and d is the view direction 302 of the current sample. A dense neural network is denoted as $\mathcal{D}_s$ with its prediction $\mathcal{D}_s(y)$ being denoted for a given input vector y. The final radiance is obtained at training time with:

$$c(x, d) = c_i(x) + c_d(x, d) \qquad (5)$$

In some examples, the radiance module 208 includes the dropout layer 306 applied to the output of the view-dependent neural radiance field 224 ($\mathcal{D}_{c_d}$) during training. The dropout layer 306 enforces the radiance module 208 to perform a meaningful decomposition of the radiance that is output as the view-independent radiance 222 and the view-dependent radiance 226. For example, the view-dependent neural radiance field 224 with a dropout probability of p=0.01, configures the radiance module 208 to drop the view-dependent radiance 226 output from the view-dependent neural radiance field 224 for one percent of the samples x. This way, the dropout layer 306 guides the view-independent neural radiance field 220 to capture as much of the signal as possible by forcing the view-independent neural radiance field 220 to learn aspects that can be explained without the view direction 302 (*d*), which prevents diffuse effects from being predicted by the view-independent neural radiance field 220.

As highlighted by the techniques described in Ref-NeRF, directly inputting the view direction 302 (*d*) into the view-dependent neural radiance field 224 ($\mathcal{D}_{c_d}$) may lead to poor learning by the view-independent neural radiance field 220 ($\mathcal{D}_{c_i}$), particularly on glossy surfaces. Instead, a reparameterization of the view direction d is used with a reflected vector $\omega_r$. relative the predicted normal n. In addition, as described in Ref-NeRF, an Integrated Directional Encoding (IDE) function is applied to the reparameterization of the view direction d. The IDE function accounts for the aperture of the cone of reflection depending on an estimated roughness. As such, the view-dependent radiance 226 is written as:

$$c_d(x, d) = \mathcal{D}_{c_d}(a_x, \omega_r, (\omega_r, n_x), IDE(\omega_r, \kappa_x)) \qquad (6)$$

In the above, the normal n and the roughness coefficient $\kappa$ are derived from the material properties 218 predicted by the material module 206.

As mentioned previously, the radiance module 208 receives the latent appearance 216 and the material properties 218 as outputs from the material module 206. The radiance module 208 determines the roughness coefficient $\kappa_x$ and the normal $n_x$ coefficient from the latent appearance 216 (e.g., vector $a_x$). More specifically, the radiance module 208 determines the roughness coefficient $\kappa_x$ and the normal $n_x$ coefficient as:

$$n_x = \mathcal{D}_n(a_x) \qquad (7)$$

$$(\gamma_x, F_{0,x}, \kappa_x) = \mathcal{D}_\beta(a_x)$$

$$\rho_x = \mathcal{D}_\rho(\kappa_x)$$

Enabling the radiance module 208 to determine a roughness $\kappa_x$ coefficient that is separate from the notion of roughness used by the render module 212 configures the radiance module 208 to provide more sensibility to variations in the viewing direction 302, especially in glossy areas in comparison to rough areas. In some examples, the IDE roughness $\kappa_x$ coefficient is related, but not identical to the physically based roughness parameter $\rho_x$ within the material properties 218 determined by the material module 206 for input to the BSDF model of the render module 212. In other examples, the physically based roughness $\rho_x$ is determined completely independent from the IDE roughness $\kappa_x$. However, having two separate roughness parameters with no co-dependency may cause the view synthesis model to stagnate when evaluating a local maxima. As such, the radiance module 208 inputs the roughness $\kappa_x$ coefficient (e.g., the Fourier features of the roughness Kx coefficient) to the view-dependent neural radiance field 224.

The radiance module 208 outputs the view-independent radiance 222 and the view-dependent radiance 226 decomposed from the digital images 122. By decomposing the radiance this way, in addition to using the directional encoding 304, the radiance module 208 is operable to retrieve high-frequency details, which are typically associated with glossiness, and further operable to finely supervise the production of the intrinsic properties 126 maintained by the render module 212.

To train the radiance module 208 for determining the view-independent radiance 222 and the view-dependent radiance 226, the neural network of the radiance module 208 (e.g., the view-independent neural radiance field 220 and the view-dependent neural radiance field 224) is overfit-trained based on the digital images 122. Once trained, the radiance module 208 is specifically tuned for determining radiance effects associated with the 3D scene depicted in the digital images 122. To analyze a different scene from a different set of digital images, the radiance module 208 is retrained to overfit-train the other images.

Figure 4:
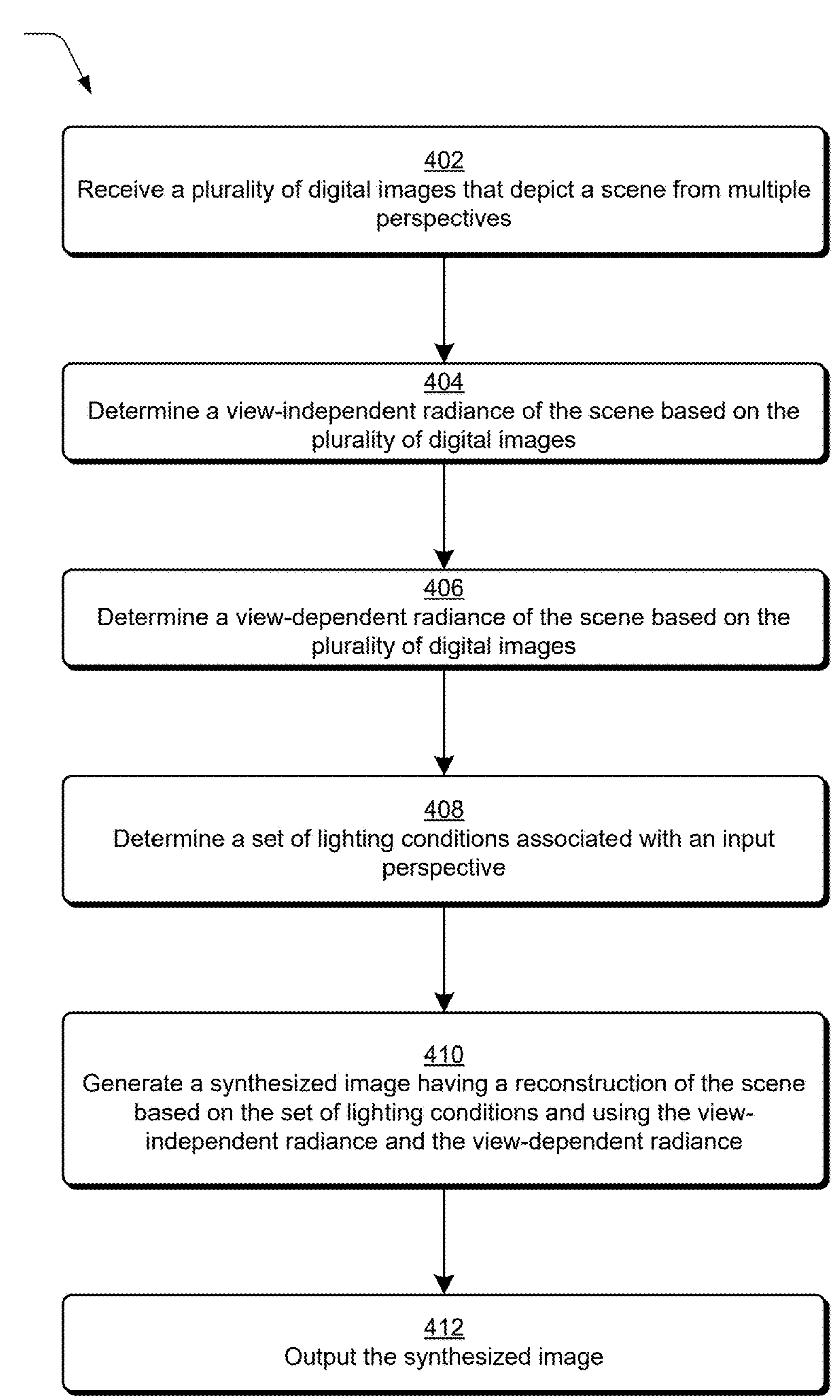
FIG. 4 is a flow diagram depicting an algorithm as a step-by-step procedure in an example implementation of the radiance component, which is performable by a processing device to isolate view-dependent radiance effects from view-independent radiance effects determined for relightable scene reconstructions generated using radiance guided material extraction.

FIG. 4 is a flow diagram depicting an algorithm as a step-by-step procedure 400 in an example implementation of the radiance component, which is performable by a processing device to isolate view-dependent radiance from view-independent radiance determined for relightable scene reconstructions generated using radiance guided material extraction. The procedure 400 is executed by the view synthesis model 202 to perform radiance isolation for synthesizing perspectives of a 3D scene depicted in the digital images 122.

At the start of the procedure 400, a plurality of digital images that depict a scene from multiple perspectives is received (block 402). For example, the content processing system 104 of the computing device 102 executes the view synthesis model 202. Upon execution, the view synthesis model 202 receives an input of the digital images 122, which depict a 3D scene from a limited set of view directions or perspectives.

Next, a view-independent radiance of the scene is determined based on the plurality of digital images (block 404). For instance, the radiance module 208 has at least one neural network that is overfit-trained based on the digital images 122 to assign view-independent radiance characteristics to a reconstruction of the scene. The view-independent neural radiance field 220 is one such neural network of the radiance module 208. From an output of the material module 206, the view-independent neural radiance field 220 receives a latent appearance 216 associated with an input location within the scene. Based on the latent appearance 216, the view-independent radiance 222 is output from the view-independent neural radiance field 220.

In addition, a view-dependent radiance of the scene is determined based on the plurality of digital images (block 406). For example, the radiance module 208 has at least one neural network that is overfit-trained based on the digital images 122 to assign view-dependent radiance characteristics to the reconstruction of the scene. The view-dependent neural radiance field 224 is one such neural network of the radiance module 208. Based on the view direction 302, as well as the latent appearance 216 and the material properties 218 obtained from the material module 206, the view-dependent neural radiance field 224 determines the view-dependent radiance 226. The material properties 218 may include a normal property and a roughness property of the scene at the input location, however, the normal property and the roughness property may be different than the normal and the roughness that are input to the render module 212. In other words, the view-dependent neural radiance field 224 may modify the material properties 218 before using them as inputs for determining the view-dependent radiance 226. The view-dependent radiance 226 is output from the view-independent neural radiance field 220.

The view-independent radiance 222 and the view-dependent radiance 226 are used to supervise the outputs of the render module 212. For example, a diffuse radiance output from the render module 212 for determining a reconstruction of the scene is supervised using the view-independent radiance 222. Also, a specular radiance output from the render module 212 for determining the reconstruction of the scene is supervised using the view-dependent radiance 226.

In addition, the view-independent radiance 222 and the view-dependent radiance 226 are encoded within the lighting module 210 along with the Laplacian pyramid environment map structure 228 used to represent original lighting conditions. The lighting module 210 stores or encodes the view-independent radiance 222 and the view-dependent radiance 226 separate from with the Laplacian pyramid environment map structure 228 as radiance characteristics. The render module 212 accesses the radiance characteristics (e.g., the incidence illumination 230) output from the lighting module 210 to generate the synthesized image 118.

Then, the procedure 400 continues with a set of lighting conditions associated with an input perspective being determined (block 408). For instance, the environment map 124 is received by the view synthesis model 202. The environment map 124 may specify different environmental lighting (e.g., different lighting conditions) for rendering the scene. In the absence of receiving the environment map 124, the lighting module 210 relies on the Laplacian pyramid environment map structure 228 to represent the lighting conditions as extracted from the digital images 122. In addition, the view direction 302 is received by the view synthesis model 202 to define a perspective of the scene for rendering.

The procedure 400 continues with a synthesized image is generated having a reconstruction of the scene based on the set of lighting conditions and using the view-independent radiance and the view-dependent radiance (block 410). For example, the render module 212 queries the lighting module 210 to obtain the incidence illumination 230 on the reconstruction of objects in the scene and queries the environment map 124 or in its absence, the Laplacian pyramid environment map structure 228 for obtaining the incidence illumination 230 on the reconstruction of free space in the scene. The synthesized image 118 is generated by the render module 212 from the reconstruction by applying the incidence illumination 230 to the diffuse radiance and the specular radiance originally supervised by the radiance module 208.

Lastly, the synthesized image is output (block 412). For example, the view synthesis model 202 outputs the synthesized image 118 for display in the user interface 110. The synthesized image 118 is stored as the digital content 106, which may be obtained by other digital content applications executing on the computing device 102 that perform functions or tasks utilizing the synthesized image 118.

Figure 5:
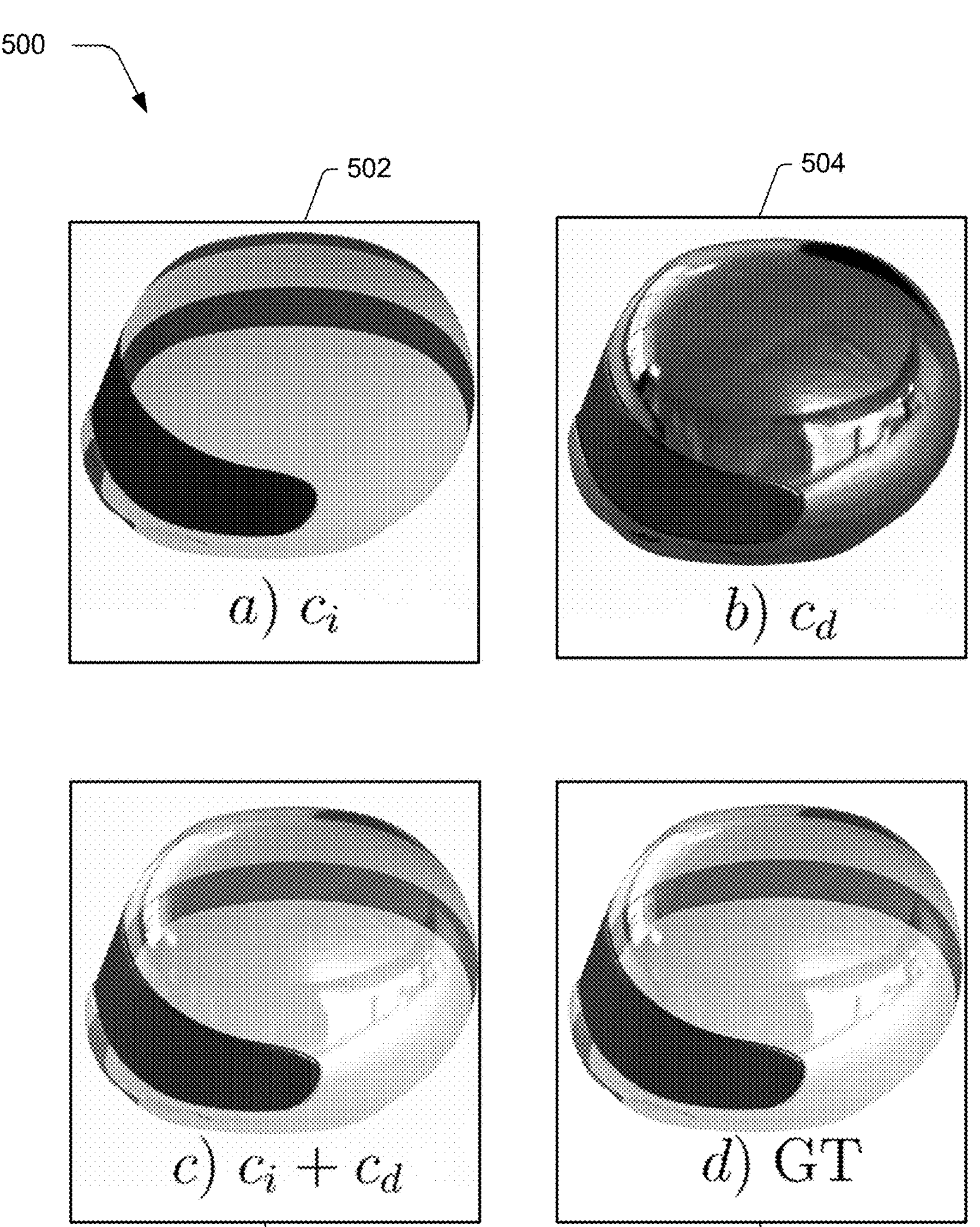
FIG. 5 depicts a visualization of view-dependent radiance effects and view-independent radiance effects extracted for generating relightable scene reconstructions using radiance guided material extraction.

FIG. 5 depicts a visualization 500 of view-dependent radiance effects and view-independent radiance effects extracted for generating relightable scene reconstructions using radiance guided material extraction. For example, images 502 through 504 depict radiance effects determined in response to overfitting the view synthesis model 202 to the digital images 122. The view-independent radiance 222 $c_i(x)$ is shown as image 502. Juxtaposed to the image 502, the view-dependent radiance 226 $c_d$ is depicted as image 504. A recombination of the view-independent radiance 222 $c_i(x)$ and the view-dependent radiance 226 ca is shown as image 506. A ground truth of the 3D scene inferred from the digital images 122 is depicted as image 508.

The radiance module 208 outputs the view-independent radiance 222 and the view-dependent radiance 226 to supervise the outputs of the render module 212. The supervision provided by the radiance module 208 causes the density module 204, the material module 206, and the radiance module 208 help the render module 212 learn the intrinsic properties 126 of the 3D scene depicted in the digital images 122. The intrinsic properties 126 are used by the render module 212 to generate a reconstruction of the scene for rendering the synthesized image 118.

Laplacian Pyramid Environment Mapping for View Synthesis

Figure 6:
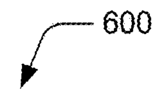
FIG. 6 depicts a system as an example implementation of a lighting module that is operable to maintain an expressive environment map structure that is based on a Laplacian pyramid for relighting scene reconstructions generated using radiance guided material extraction.
Figure 6:
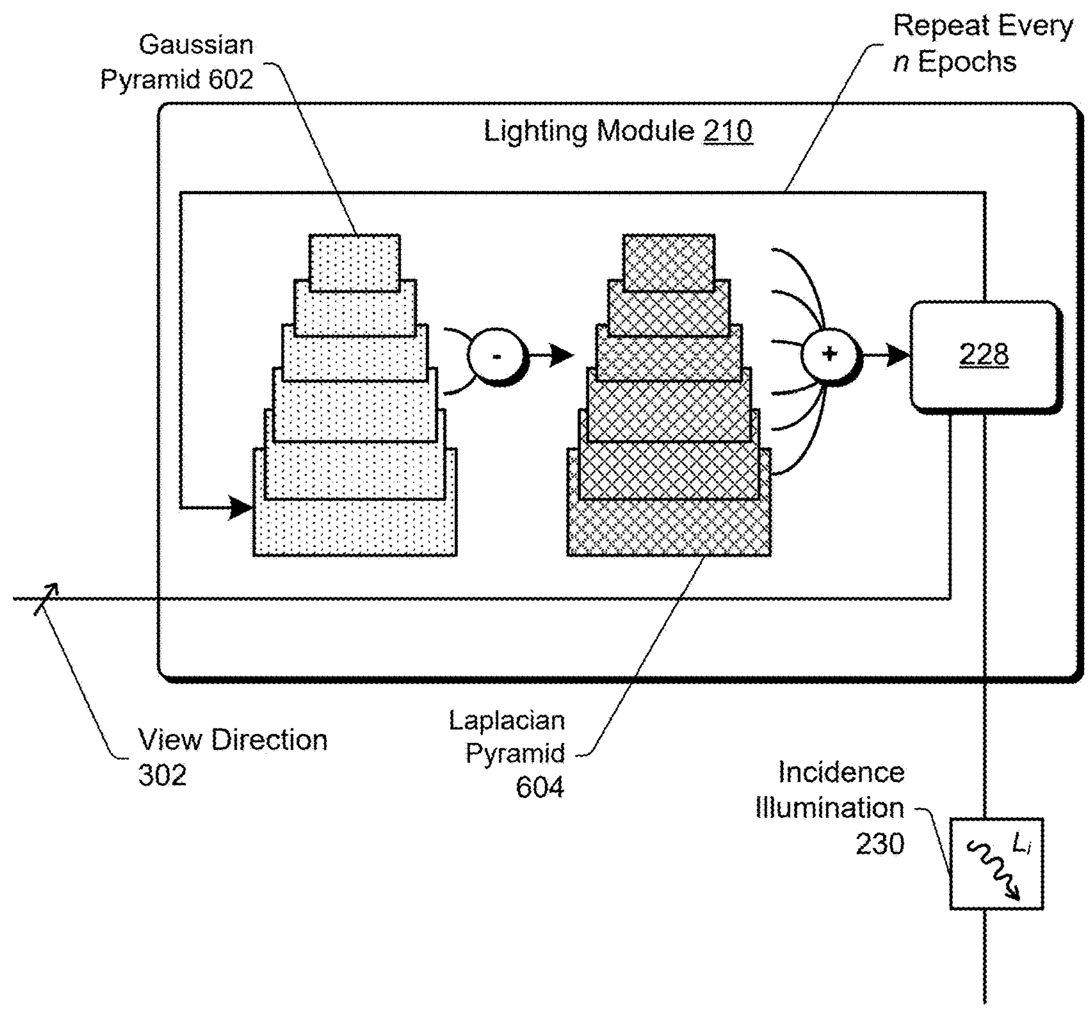

FIG. 6 depicts a system 600 as an example implementation of a lighting module that is operable to maintain an expressive environment map structure that is based on a Laplacian pyramid. The Laplacian pyramid environment map structure enables scene reconstructions generated using radiance guided material extraction to be relighted. For example, the system 600 includes the lighting module 210, which maintains the Laplacian pyramid environment map structure 228.

The lighting module 210 is operable to encode environment lighting retrieved from the digital images 122 in the Laplacian pyramid environment map structure 228. Conventional view synthesis techniques, such as TensoIR and NeRFactor, represent environment maps with Spherical Gaussians or in other ways. While compact, Spherical Gaussians have difficulty representing lighting conditions in high-frequency environments. Spherical Gaussians may fail to extract fine details from the digital images 122. Instead of encoding the environment lighting using Spherical Gaussians, the lighting module 210 encodes the environment lighting using the Laplacian pyramid environment map structure 228. When compared to Spherical Gaussians, the Laplacian pyramid environment map structure 228 is better at extracting fine details from the digital images 122. As such, the Laplacian pyramid environment map structure 228 is more likely to capture ground truth from the digital images 122, which results in a more realistic rendering of the synthesized image 118.

The digital images 122 are first used to generate an initial environment map as a Gaussian pyramid 602. The Gaussian pyramid 602 is built from a series of down sampled versions of the digital images 122. Given the Gaussian pyramid 602, a Laplacian pyramid 604 of the digital images 122 is computed. From the Laplacian pyramid 604, a set of parameters associated with the different levels of the Laplacian pyramid 604 are determined. The parameters are maintained as the Laplacian pyramid environment map structure 228.

The levels of the Laplacian pyramid 604 are parameters, which are optimized for reconstructing lighting conditions when the Laplacian pyramid environment map structure 228 is sampled for the view direction 302 being rendered. During optimization, at each step, the Laplacian pyramid environment map structure 228 is reconstructed from the parameters inferred from the Laplacian pyramid 604. As the parameters are optimized, there is no guarantee that the parameters of the Laplacian pyramid environment map structure 228 indeed represent the Laplacian pyramid 604. To enforce the representation of the Laplacian pyramid structure, the Laplacian pyramid environment map structure 228 is rebalanced periodically. For example, the lighting module 210 periodically rebalances the Laplacian pyramid environment map structure 228 to repackage or fit the lighting conditions to the Laplacian pyramid 604. In some cases, at the end of n epochs (e.g., sixteen iterations), a reprojection step is repeated by the lighting module 210 where the parameters are used to reconstruct a signal from which a corresponding pyramid is computed. Then the parameters of the Laplacian pyramid environment map structure 228 are reassigned the values of the computed Laplacian pyramid 604. This way, the Laplacian pyramid environment map structure 228 is occasionally balanced to ensure the parameters continue to fit the Laplacian pyramid 604.

The Laplacian pyramid environment map structure 228 better learns low frequencies than raw pixels and better supports high frequencies, which Spherical Gaussians cannot grasp. The incidence illumination 230 is retrieved from the lighting conditions maintained by the Laplacian pyramid environment map structure 228 given the view direction 302. The incidence illumination 230 directs the render module 212 to accurately apply radiance effects to a rendering of a different view of the scene depicted in the digital images 122.

Figure 7:
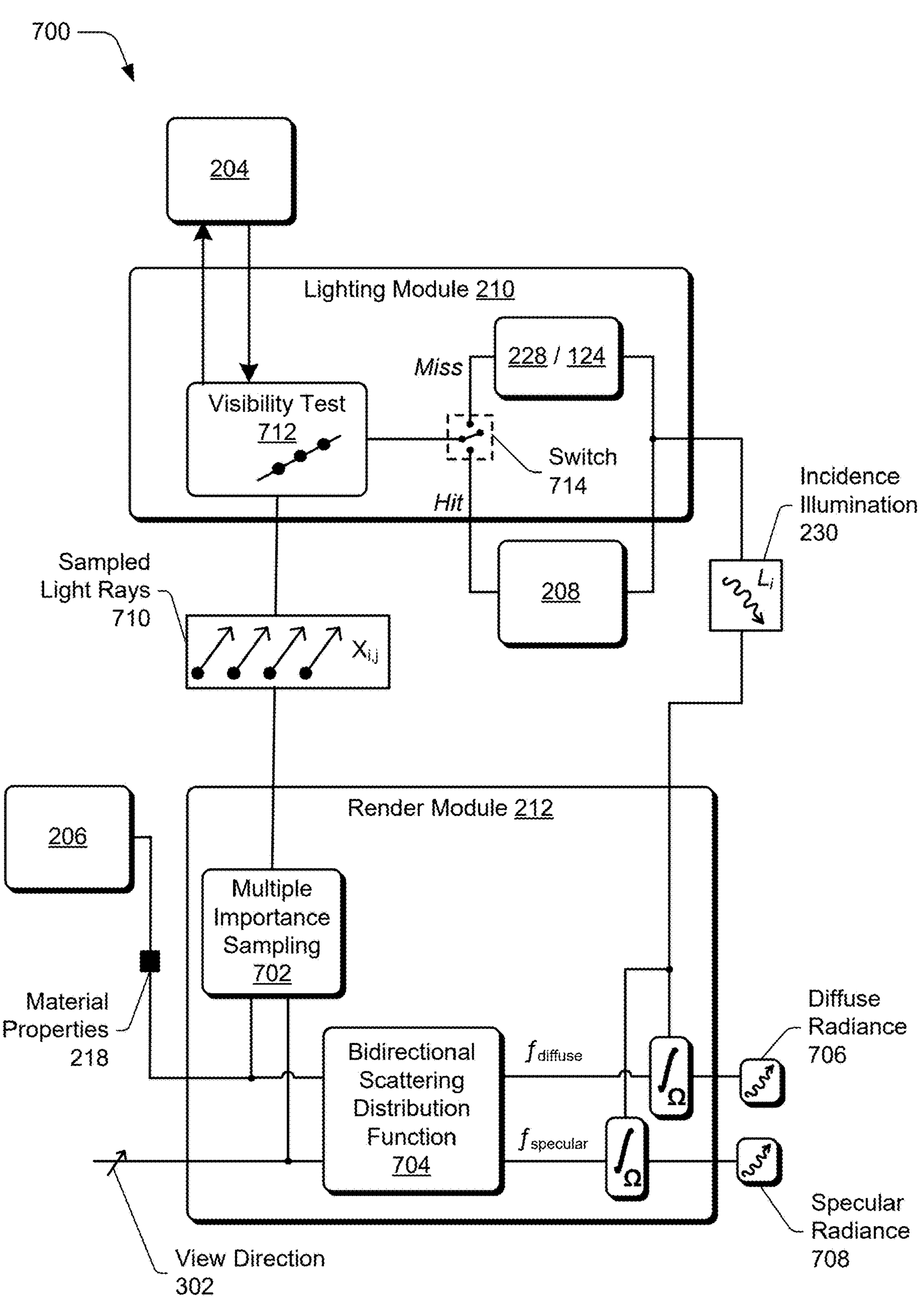
FIG. 7 depicts a system as an example implementation of a render module that is operable to access an expressive environment map structure that is based on a Laplacian pyramid for relighting scene reconstructions generated using radiance guided material extraction.

FIG. 7 depicts a system 700 as an example implementation of a render module that is operable to access an expressive environment map structure that is based on a Laplacian pyramid for relighting scene reconstructions generated using radiance guided material extraction. For example, the system 700 includes the lighting module 210, which maintains the Laplacian pyramid environment map structure 228, shown interfacing with the render module 212 to generate the synthesized image 118. In examples where the environment map 124 is received as input to the view synthesis model 202, the lighting module 210 relies on the environment map 124 instead of the Laplacian pyramid environment map structure 228.

The system 700 operably couples the density module 204, the material module 206, the radiance module 208, the lighting module 210, and the render module 212, to perform view synthesis techniques for rendering the synthesized image 118 showing a different view of the scene depicted in the digital images 122. The render module 212 is configured to receive the material properties 218 and the view direction 302 and in response, output a diffuse radiance 706 and a specular radiance 708 (e.g., a view-dependent radiance) to apply to a geometric reconstruction of the scene depicted in the digital images 122. During rendering, the render module 212 illuminates the reconstruction to have a realistic illumination or appearance given the lighting conditions defined by the Laplacian pyramid environment map structure 228 or different lighting conditions specified by the environment map 124 (e.g., if received as input).

The diffuse radiance 706 and the specular radiance 708 are determined from the incidence illumination 230 received from the lighting module 210. When combined with outputs of a bidirectional scattering distribution function 704 of the render module 212, the diffuse radiance 706 is combined with the specular radiance 708 to accurately shade or illuminate a rendered surface in the reconstruction of the scene.

The render module 212 uses a Multiple Importance Sampling 702 component to cause the lighting module 210 to estimate incoming light at a shaded point. The Multiple Importance Sampling 702 enables the render module 212 to feed the lighting module 210 to obtain the incidence illumination 230 for rendering different perspectives of the 3D scene. The lighting module 210 queries the radiance module 208 for determining the incidence illumination 230 applied to objects in the scene. The lighting module 210 queries the Laplacian pyramid environment map structure 228 or the environment map 124 for determining the incidence illumination 230 applied to free space (e.g., without objects) in the scene. For each sampled light ray 710 that is output from the Multiple Importance Sampling 702, either the radiance module 208 is used, or one of the Laplacian pyramid environment map structure 228 or the environment map 124 is used, depending on an outcome from raytracing through the density module 204. For each of the sampled light rays 710, the incidence illumination 230 ($L_i$) is evaluated coming from the view direction 302.

For light synthesis under different perspectives than the digital images 122, the radiance module 208 is replaced by a recursive call to the render module 212. For example, a visibility test 712 is executed in the lighting module 210 to determine whether the density module 204 indicates a material surface is at a location of the sampled light rays 710 or whether free space is detected. When the material surface is detected by the visibility test 712, the radiance module 208 is queried for determining the incidence illumination 230. A switch 714 couples an output of the visibility test 712 to the radiance module 208, which outputs the incidence illumination 230 to the render module 212. In other cases, when no material surface is detected by the visibility test 712, the switch 714 is operable to couple the output of the visibility test 712 to the Laplacian pyramid environment map structure 228 or the environment map 124 (if used) for retrieving the incidence illumination 230 defined for free space targeted by the sampled light rays 710.

The render module 212 predicts the diffuse radiance 706 (e.g., a view-independent radiance) and the specular radiance 708 (e.g., a view-dependent radiance). The render module 212 predicts these radiances in a physically based way, which is user editable through changing the environment map 124. The render module 212 is fully differentiable, meaning an error gradient can flow up to the representation of the material properties 218 and environment light defined by the incidence illumination 230.

The render module 212 implements a render procedure, which evaluates the physically based radiance $c_{PB}$ based on the rendering equation:

$$c_{PB}(\hat{x}, \omega_o) = \int_{\Omega} L_i(\hat{x}, \omega_i) f_r(\omega_o, \omega_i; \beta)(\omega_i, n) + d\omega_i \tag{8}$$

In the above, $\hat{x}$ is the surface point at which the raytracing stopped, $\omega_o$=−d is the viewing direction, $L_i(\hat{x},\omega_i)$ is the incident illumination corning from a direction $\omega_i$, $\beta=(\gamma,F_0,\rho)$ are the material properties 218, and n is the normal at i.

The bidirectional scattering distribution function 704 $f_r$ can be split into diffuse (view-independent) and specular (view-dependent) terms:

$$f_r(\omega_o, \omega_i; \beta) = f_{diffuse}(Y) + f_{specular}(\omega_o, \omega_i; \beta) \tag{9}$$

Integrating these terms separately $$\left(\text{e.g., as } c_{PB}^{dif} \text{ and } c_{PB}^{spec}\right)$$

enables the render module 212 to supervise them using the respective outputs $c_i$ and $c_d$ from the radiance module 208 (e.g., the view-independent radiance 222 and the view-dependent radiance 226). In some examples, the bidirectional scattering distribution function 704 is modeled on the Torrance-Sparrow model with a normal distribution function based on the Beckmann-Spizzichino model.

Figure 8:
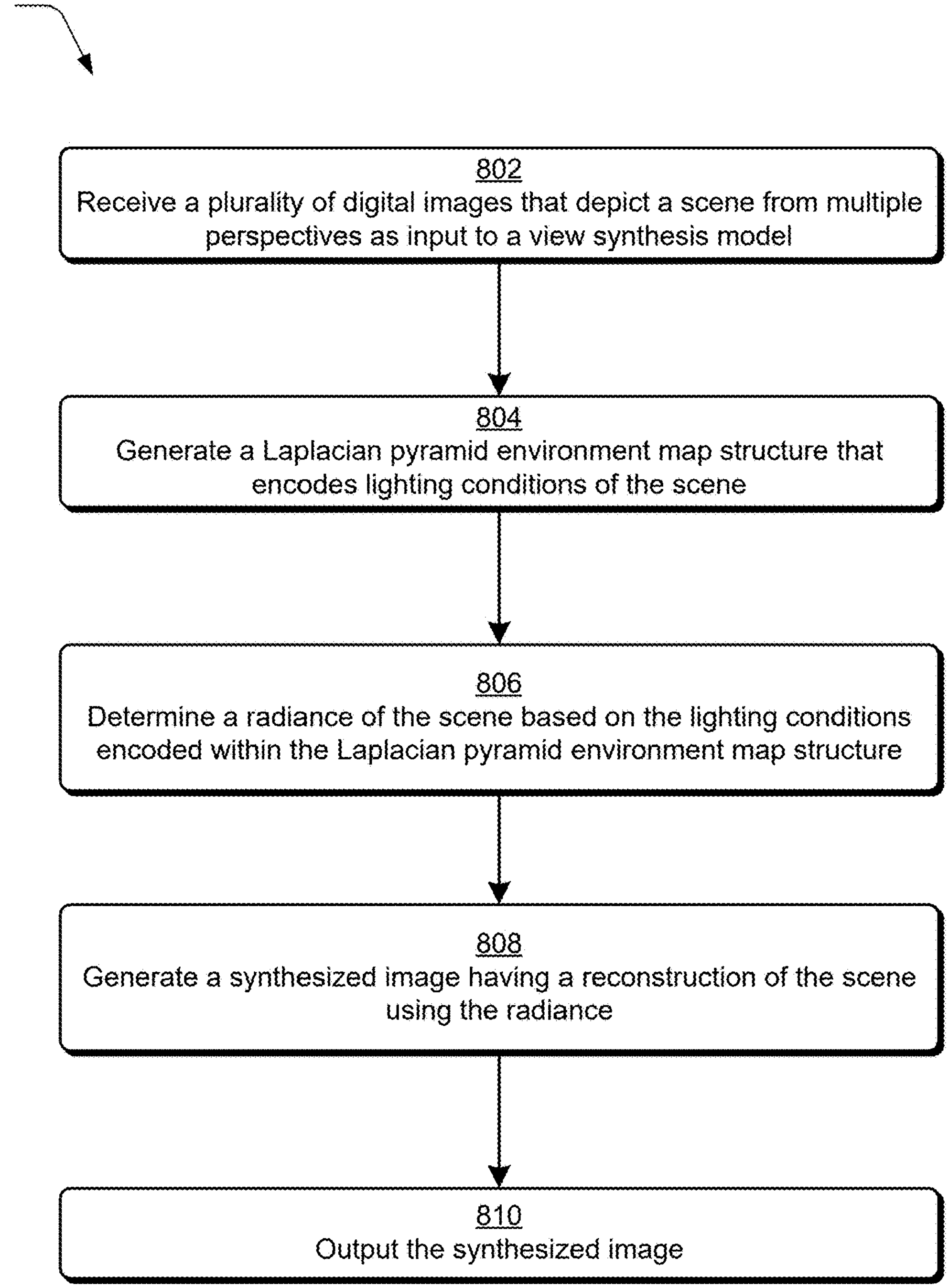
FIG. 8 is a flow diagram depicting an algorithm as a step-by-step procedure in an example implementation of the lighting component, which is performable by a processing device to output incidence illumination for rendering relightable scene reconstructions generated using radiance guided material extraction.

FIG. 8 is a flow diagram depicting an algorithm as a step-by-step procedure 800 in an example implementation of the lighting component, which is performable by a processing device to output incidence illumination for rendering relightable scene reconstructions generated using radiance guided material extraction. The procedure 800 is executed by the view synthesis model 202 to perform Laplacian pyramid environment mapping for synthesizing perspectives of a 3D scene depicted in the digital images 122.

At the start of the procedure 800, a plurality of digital images that depict a scene from multiple perspectives is received (block 802). For example, the view synthesis module 116 executes on the content processing system 104. Upon execution of the view synthesis module 116, the view synthesis model 202 receives the digital images 122, which depict a 3D scene from a limited set of perspectives or view directions.

Next, a Laplacian pyramid environment map structure is generated to encode lighting conditions of the scene (block 804). For instance, the view synthesis model 202 is operable interface with the radiance module 208, which encodes the view-independent radiance 222 and the view-dependent radiance 226. The lighting module 210 is further operable to generate the Laplacian pyramid environment map structure 228 to encode the lighting conditions of the scene. The Laplacian pyramid environment map structure 228 encodes the original lighting conditions for subsequent retrieval as the incidence illumination 230 (i.e., the irradiance) used during rendering of the synthesized image 118. In other examples, the environment map 124 is queried to derive different lighting conditions for rendering the synthesized image 118.

Then, a radiance of the scene is determined based on the lighting conditions encoded within the Laplacian pyramid environment map structure (block 806). For example, the render module 212 queries the lighting module 210 to obtain the incidence illumination 230 on the reconstruction of the scene. For example, the render module 212 executes a multiple importance sampling (MIS) algorithm to obtain the incidence illumination 230 for multiple rays provided to the lighting module 210 as input. The render module 212 may determine the view-independent radiance 222 of the scene and the view-dependent radiance 226 of the scene based on the incidence illumination 230 received from the lighting module 210.

In some examples, the Laplacian pyramid environment map structure 228 is accessed by the lighting module 210 in response to executing the MIS algorithm. In one or more implementations, the environment map 124 is received as input and the incidence illumination 230 is retrieved by the lighting module 210 from querying the environment map 124 rather than querying the Laplacian pyramid environment map structure 228. This enables different lighting conditions to be applied during the rendering of the synthesized image 118 instead of original lighting conditions derived from the digital images 122. In one or more examples, the radiance module 208 is queried by the lighting module 210 to determine a view-independent and/or a view-dependent lighting effects of the scene. From this query to the radiance module 208, the lighting module 210 outputs the incidence illumination 230 determined based on the view-independent and/or view-dependent lighting effects rather than from the Laplacian pyramid environment map structure 228 or the environment map 124.

With the radiance determined, a synthesized image having a reconstruction of the scene is generated using the radiance (block 808). For instance, the render module 212 applies the incidence illumination 230 on the reconstruction of the scene to produce an illumination of the reconstruction of the scene depicted in the digital images 122.

Lastly, the synthesized image is output (block 810). For example, the view synthesis model 202 outputs the synthesized image 118 for display in the user interface 110. The synthesized image 118 is stored as the digital content 106, which may be obtained by other digital content applications executing on the computing device 102 that perform functions or tasks utilizing the synthesized image 118.

Figure 9:
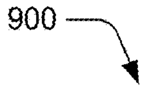
FIGS. 9 and 10 depicts visualizations of Laplacian pyramid environment map structures and renderings for generating relightable scene reconstructions using radiance guided material extraction.
Figure 9:
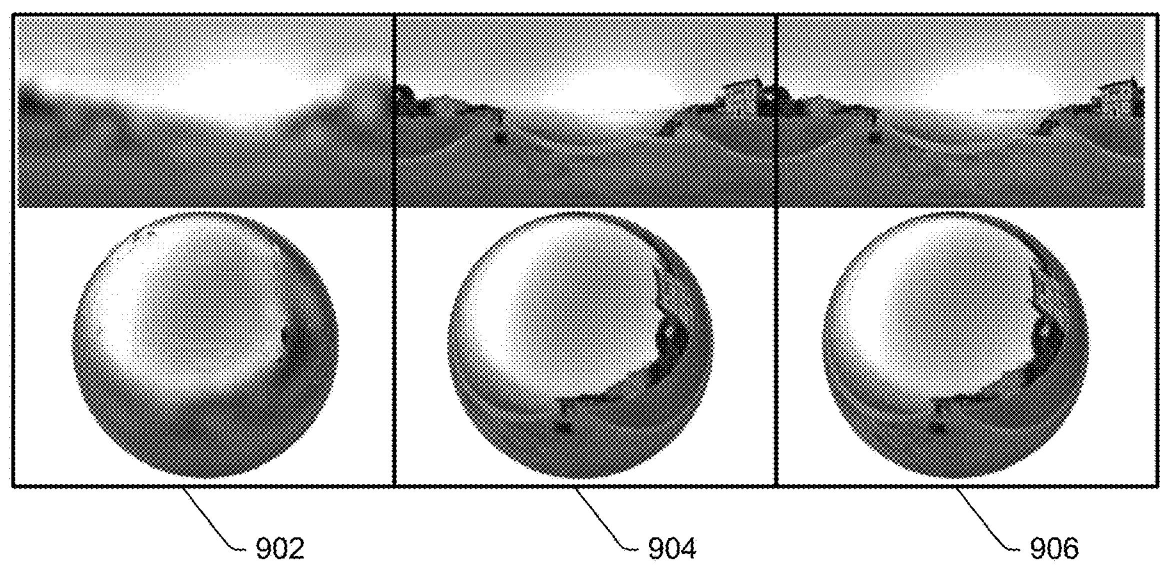
Figure 10:
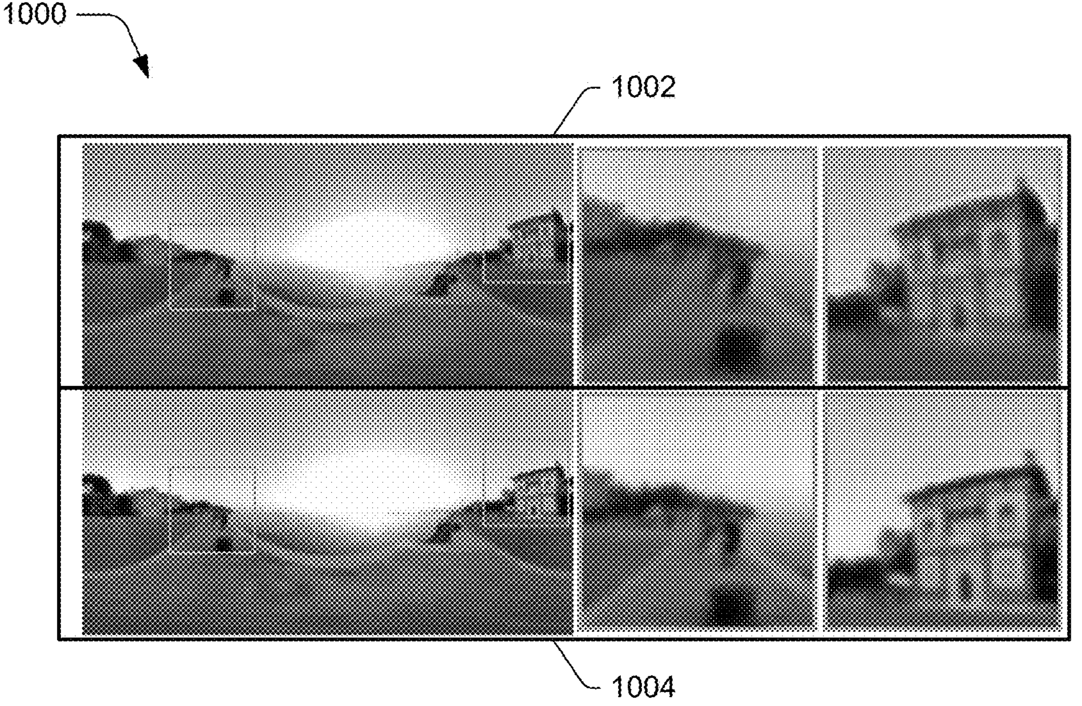

FIGS. 9 and 10 depicts visualizations of Laplacian pyramid environment map structures and renderings for generating relightable scene reconstructions using radiance guided material extraction. FIG. 9, for example, shows images 900 that include side-by-side comparisons of environment maps and spherical renderings generated therefrom using various light estimation techniques. The images 900 depict reconstructed environment maps and corresponding renderings for a scene made of a specular sphere when different representations of the environment are applied.

For example, a Spherical Gaussian based environment map and a corresponding rendering on a sphere is shown in image portion 902. An example Laplacian pyramid environment map structure (e.g., the Laplacian pyramid environment map structure 228) and a corresponding rendering on a sphere is shown in image portion 904. Lastly, a ground truth environment map and a corresponding rendering on a sphere is shown in image portion 906.

The advantages of using the Laplacian pyramid environment map structure (e.g., the Laplacian pyramid environment map structure 228) is evident from comparing the image portions 902 and 904 to the ground truth in the image portion 906. The spherical Gaussians in the image portion 902 fail at extracting fine details, while the Laplacian pyramid environment map structure in the image portion 904 achieves a closer representation to the ground truth in the image portion 906.

FIG. 10, for example, shows images 1000 that include side-by-side comparisons of environment maps generated using different sized Laplacian pyramids. Previous view synthesis techniques, for example, as described by TensoIR and NeRFactor, represent environment maps with Spherical Gaussians. While compact, Spherical Gaussians have difficulty representing lighting conditions in high-frequency environments. This leads to slow and noisy convergence of the lighting, leading to a rough optimization landscape for a normal parameter and the other parameters.

In contrast, the lighting module 210 uses a multi-level Laplacian pyramid to eliminate noise from the environment map and provide a smoother estimate. For example, an image portion 1002 shows an environment map extracted from a single level Laplacian pyramid with artifacts shown in exploded view on the right hand side. On the other hand, an image portion 1004 depicts an environment map extracted from a six-level Laplacian pyramid with artifacts shown in exploded view on the right hand side. As shown in FIG. 10, directly optimizing the pixels of the environment map using a single level Laplacian pyramid causes a noisier environment map with boundaries artifacts when compared to the six-level Laplacian pyramid.

Figure 11:
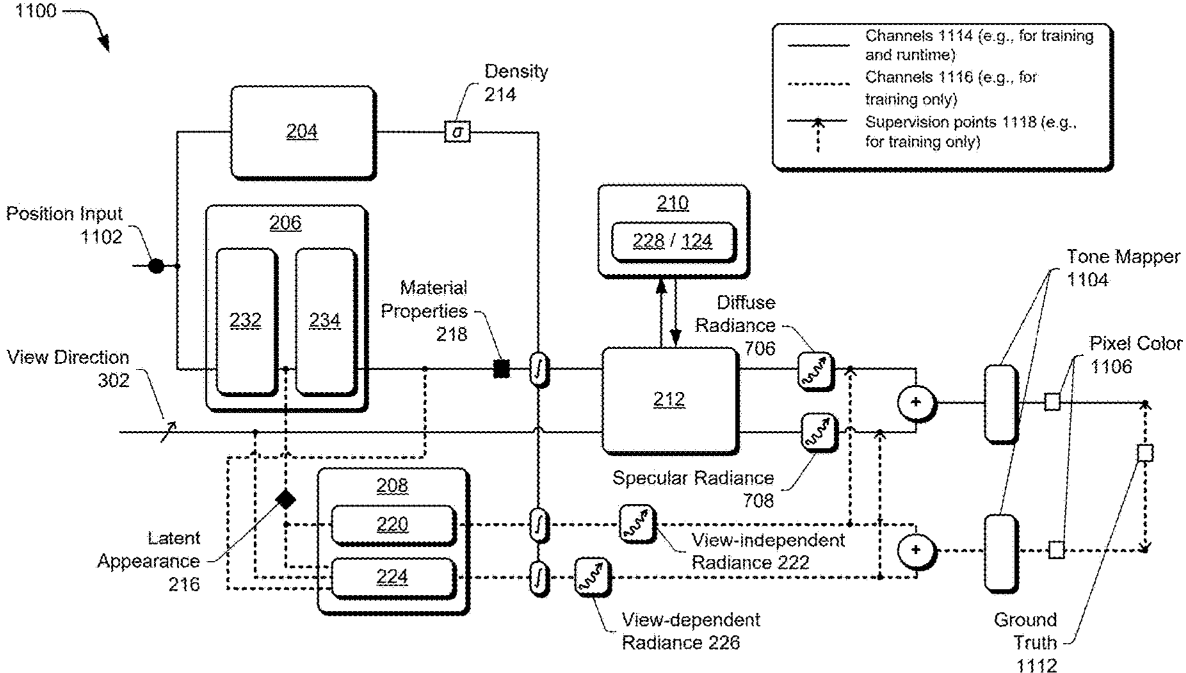
FIG. 11 depicts a system as an example architecture of a view synthesis model that is operable to employ techniques described herein for generating relightable scene reconstructions using radiance guided material extraction.

FIG. 11 depicts a system 1100 as an example architecture of a view synthesis model that is operable to employ techniques described herein for generating relightable scene reconstructions using radiance guided material extraction. The system 1100 represents an end-to-end trainable architecture as an example of the view synthesis model 202, which is operable to perform inverse rendering techniques.

The system 1100 includes the density module 204, the material module 206, the radiance module 208, the lighting module 210, and the render module 212. The system 1100 receives the view direction 302 and a position input 1102. The position input 1102 and the view direction 302 are used during ray tracing processes to cast rays into a scene depicted in the digital images 122 to generate a volumetric reconstruction.

A set of channels 1114 is depicted in FIG. 11 showing various interconnects between the components of the system 1100, which are enabled at run-time and during training. Another set of channels 1116 is depicted in FIG. 11 showing various interconnects between the components of the system 1100, which are disabled at run-time but enabled during training. A set of supervision points 1118 are illustrated, which indicate where (during training) various outputs of the system 1100 are being supervised. During training, the channels 1116 couple the view-independent radiance 222 with the diffuse radiance 706 for supervision at the supervision points 1118. Also at the supervision points 1118, the channels 1116 couple the view-dependent radiance 226 with the specular radiance 708 for supervision during training. The channels 1114 are enabled during training and after training. The channels 1116 are enabled during training to enable the render module 212 to determine the reconstruction. The channels 1116 are disabled, however, by the render module 212 to render the reconstruction (e.g., into the synthesized image 118). For example, the channels 1116, when disabled, decouple the view-independent radiance 222 from the diffuse radiance 706, and decouple the view-dependent radiance 226 from the specular radiance 708.

In addition to the above mentioned components, the system 1100 also includes a tone mapper 1104 (e.g., a tone mapping module) that maps linear radiance values output from the render module 212 (e.g., the diffuse radiance 706 and the specular radiance 708) into a color space derived from the digital images 122. For example, a pixel color 1106 is derived by the tone mapper 1104 from the diffuse radiance 706 and the specular radiance 708. During training, with the channels 1116 enabled, the tone mapper 1104 also maps linear radiance values output from the radiance module 208 into the color space associated with the digital images 122. For instance, a pixel color 1106 is derived by the tone mapper from the view-independent radiance 222 and the view-dependent radiance 226.

The pixel color 1106 from the render module 212 and from the radiance module 208 are compared to ground truth 1112. This comparison is used to determine a loss function for the render module 212. The loss function of the render module 212 is improved during training by supervising the diffuse radiance 706 and the specular radiance 708, respectively, with the view-independent radiance 222 and the view-dependent radiance 226.

For example, the render module 212 is operable to determine the diffuse radiance 706 and the specular radiance 708 for rendering a reconstruction of a scene depicted in a plurality of the digital images 122. The render module 212 determines the diffuse radiance 706 and the specular radiance 708 based on the incidence illumination 230 queried from the lighting module 210. The render module 212 generates the reconstruction based in parameters learned by the density module 204, the material module 206, the radiance module 208, and the lighting module 210. The reconstruction enables the render module 212 to render the scene depicted in the digital images 122 from a specific perspective and optionally, for the lighting conditions specified by the environment map 124. As the render module 212 is learning these parameters (e.g., the intrinsic properties 126), the channels 1116 and the supervision points 1118 are enabled. The radiance module 208 is operable with the system 1100 in this training state to estimate two radiance components. The view-independent radiance 222 supervises the diffuse radiance 706 and the view-dependent radiance 226 supervises the specular radiance 708.

Supervising the diffuse radiance 706 and specular radiance 708 independently helps to disambiguate intricate visual information from the digital images 122. Although inverse rendering is an ambiguous task, this supervision achieves higher quality reconstruction parameters, which in return improves quality of the rendering.

Overall, the loss of the render module 212 that is optimized represents a weight sum of the following terms: $l_{RF}$, $l_{PB}$ are the photometric losses produced by the radiance module 208 and render module 212, respectively; $l_n$, $l_d$ the normal losses introduced by Ref-NeRF; $l_\beta$, $l_{PB}$ smoothness loss on the different parameters of the render module 212; $l_{\mathcal{G}}$ ab $l_1$ is a regularization term introduced by TensoRF; and $l_{diffuse}$, $l_{specular}$ are supervision losses on the decomposition. In contrast to TensoIR, a split between diffuse and specular losses is introduced through the techniques of this disclosure by representing these separate components as:

$$l_{diffuse} = \left|c_{PB}^{dif}(\hat{x}) - c_i(\hat{x})\right|^2 \text{ and,} \tag{10}$$

$$l_{specular} = |c_{PB}^{spec}(\hat{x}, d) - c_d(\hat{x}, d)|^2$$

In some implementations, two of the components of the system 1100 are initiated at different times. For example, improved performance may be achieved with the radiance module 208 being initialized prior to initializing the render module 212. The system 1100 may achieve a stead-rendering state ready to generate the synthesized image 118 quicker if the radiance module 208 is allowed to initialize parameters of the render module 212 prior to executing the render module 212.

Example System and Device

Figure 12:
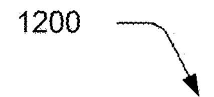
FIG. 12 illustrates an example system including various components of an example device that can be implemented as any type of computing device as described and/or utilized with reference to FIGS. 1-11 to implement examples of the techniques described herein.
Figure 12:
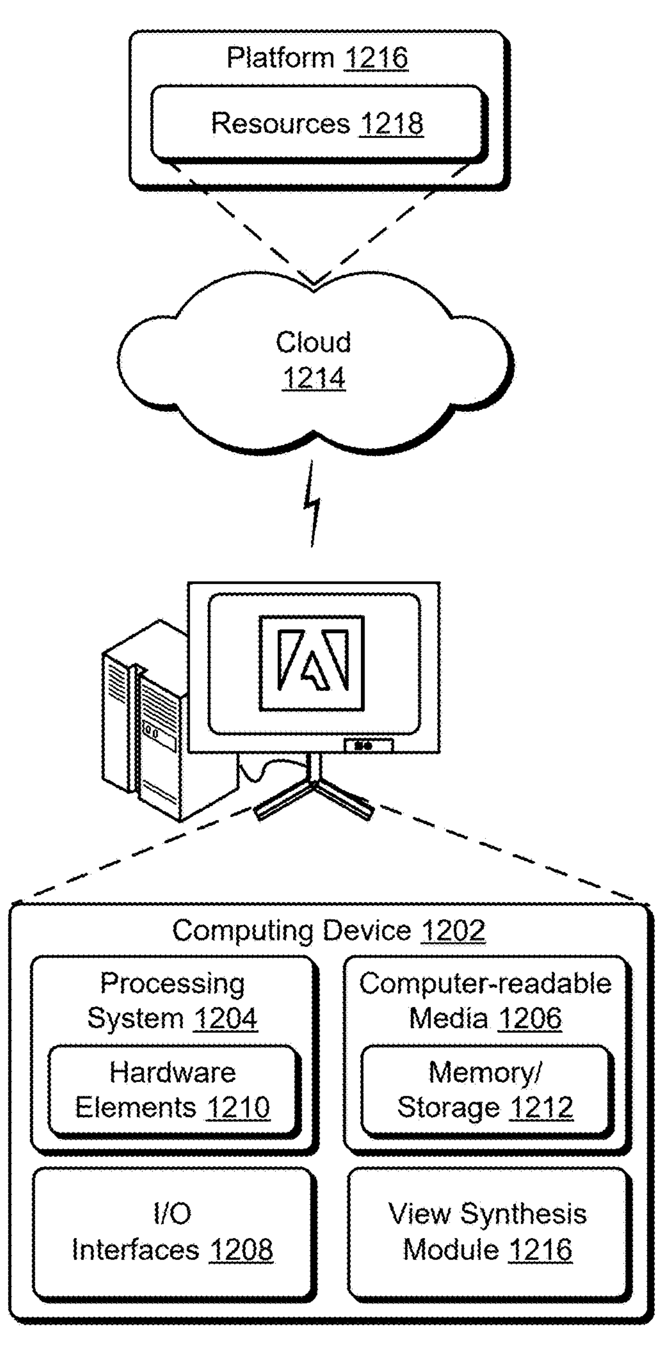

FIG. 12 illustrates an example system including various components of an example device that can be implemented as any type of computing device as described and/or utilized with reference to FIGS. 1-11 to implement examples of the techniques described herein. FIG. 12 illustrates an example system generally at 1200 that includes an example computing device 1202 that is representative of one or more computing systems and/or devices that implement the various techniques described herein. This is illustrated through inclusion of the view synthesis module 116. The computing device 1202 is configurable, for example, as a server of a service provider, a device associated with a client (e.g., a client device), an on-chip system, and/or any other suitable computing device or computing system.

The example computing device 1202 as illustrated includes a processing system 1204, one or more computer-readable media 1206, and one or more I/O interface 1208 that are communicatively coupled, one to another. Although not shown, the computing device 1202 further includes a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1204 is representative of functionality to perform one or more operations using hardware. Accordingly, the processing system 1204 is illustrated as including hardware element 1210 that is configurable as processors, functional blocks, and so forth. This includes implementation in hardware as an application specific integrated circuit or other logic device formed using one or more semiconductors. The hardware elements 1210 are not limited by the materials from which they are formed, or the processing mechanisms employed therein. For example, processors are configurable as semiconductor(s) and/or transistors (e.g., electronic integrated circuits (ICs)). In such a context, processor-executable instructions are electronically executable instructions.

The computer-readable storage media 1206 is illustrated as including memory/storage 1212. The memory/storage 1212 represents memory/storage capacity associated with one or more computer-readable media. The memory/storage 1212 includes volatile media (such as random access memory (RAM)) and/or nonvolatile media (such as read-only memory (ROM), Flash memory, optical disks, magnetic disks, and so forth). The memory/storage 1212 includes fixed media (e.g., RAM, ROM, a fixed hard drive, and so on) as well as removable media (e.g., Flash memory, a removable hard drive, an optical disc, and so forth). The computer-readable media 1206 is configurable in a variety of other ways as further described below.

Input/output interface(s) 1208 are representative of functionality to allow a user to enter commands and information to computing device 1202, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., employing visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1202 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms “module,” “functionality,” and “component” as used herein generally represent software, firmware, hardware, or a combination thereof. The features of the techniques described herein are platform-independent, meaning that the techniques are configurable on a variety of commercial computing platforms having a variety of processors.

An implementation of the described modules and techniques is stored on or transmitted across some form of computer-readable media. The computer-readable media includes a variety of media that is accessed by the computing device 1202. By way of example, and not limitation, computer-readable media includes “computer-readable storage media” and “computer-readable signal media.”

“Computer-readable storage media” refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable, and non-removable media and/or storage devices implemented in a method or technology suitable for storage of information such as computer readable instructions, data structures, program modules, logic elements/circuits, or other data. Examples of computer-readable storage media include but are not limited to RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and are accessible by a computer.

“Computer-readable signal media” refers to a signal-bearing medium that is configured to transmit instructions to the hardware of the computing device 1202, such as via a network. Signal media typically embodies computer readable instructions, data structures, program modules, or other data in a modulated data signal, such as carrier waves, data signals, or other transport mechanism. Signal media also include any information delivery media. The term “modulated data signal” means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1210 and computer-readable media 1206 are representative of modules, programmable device logic and/or fixed device logic implemented in a hardware form that are employed in some examples to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also employed to implement various techniques described herein. Accordingly, software, hardware, or executable modules are implemented as one or more instructions and/or logic embodied on some form of computer-readable storage media and/or by one or more hardware elements 1210. The computing device 1202 is configured to implement particular instructions and/or functions corresponding to the software and/or hardware modules. Accordingly, implementation of a module that is executable by the computing device 1202 as software is achieved at least partially in hardware, e.g., through use of computer-readable storage media and/or hardware elements 1210 of the processing system 1204. The instructions and/or functions are executable/operable by one or more articles of manufacture (for example, one or more computing devices 1202 and/or processing systems 1204) to implement techniques, modules, and examples described herein.

The techniques described herein are supported by various configurations of the computing device 1202 and are not limited to the specific examples of the techniques described herein. This functionality is also implementable or partially implementable through use of a distributed system, such as over a "cloud" 1214 via a platform 1216 as described below.

The cloud 1214 includes and/or is representative of a platform 1216 for resources 1218. The platform 1216 abstracts underlying functionality of hardware (e.g., servers) and software resources of the cloud 1214. The resources 1218 include applications and/or data that can be utilized while computer processing is executed on servers that are remote from the computing device 1202. Resources 1218 can also include services provided over the Internet and/or through a subscriber network, such as a cellular or Wi-Fi network.

The platform 1216 abstracts resources and functions to connect the computing device 1202 with other computing devices. The platform 1216 also serves to abstract scaling of resources to provide a corresponding level of scale to encountered demand for the resources 1218 that are implemented via the platform 1216. Accordingly, in an interconnected device example, implementation of functionality described herein is distributable throughout the system 1200. For example, the functionality is implementable in part on the computing device 1202 as well as via the platform 1216 that abstracts the functionality of the cloud 1214.

Although the techniques have been described in language specific to structural features and/or methodological acts, it is to be understood that the techniques defined in the appended claims are not limited to the specific features or acts described. Rather, the specific features and acts are disclosed as example forms of implementing the claims.

What is claimed is:

1. A method comprising:

receiving, by a processing device, a plurality of digital images that depict a scene from multiple perspectives;

determining, by the processing device, a view-independent radiance of the scene and a view-dependent radiance of the scene by overfitting a neural network based on the plurality of digital images;

determining, by the processing device, a set of lighting conditions associated with an input perspective;

generating, by the processing device, a synthesized image having a reconstruction of the scene based on the set of lighting conditions using the view-independent radiance and the view-dependent radiance; and outputting, by the processing device, the synthesized image.

2. The method of claim 1, wherein the overfitting includes at least one of:

applying a dropout layer to an output of the view-dependent radiance during training;

using a directional encoding based on material properties to determine the view-dependent radiance; or encoding a latent appearance in a TensoRF field.

3. The method of claim 1, wherein the neural network comprises:

a first neural radiance field that determines the view-independent radiance; and a second neural radiance field that determines the view-dependent radiance.

4. The method of claim 1, further comprising:

determining, by the processing device, a latent appearance of the scene based on the digital images, wherein determining the view-independent radiance comprises determining the view-independent radiance based on the latent appearance.

5. The method of claim 4, further comprising:

determining, by the processing device, a view direction into the scene based on the digital images; and determining, by the processing device, a set of material properties of the scene based on the digital images, wherein determining the view-dependent radiance comprises determining the view-dependent radiance based on the view direction, the latent appearance, and the material properties.

6. The method of claim 5, wherein the material properties comprise a normal property and a roughness property of the scene.

7. The method of claim 5, further comprising:

overfitting, by the processing device, a neural network based on the digital images to determine the latent appearance and to determine the material properties.

8. The method of claim 1, further comprising:

generating, by the processing device, the reconstruction by supervising a loss function with the view-dependent radiance and with the view-independent radiance.

9. The method of claim 1, further comprising:

generating, by the processing device, an environment map to store the view-dependent radiance and the view-independent radiance as lighting information used for generating the synthesized digital image.

10. The method of claim 9, wherein the environment map comprises a Laplacian pyramid environment map structure.

11. A method comprising:

receiving, by a processing device, a plurality of digital images that depict a scene from multiple perspectives;

generating, by the processing device, a Laplacian pyramid environment map structure that encodes lighting conditions of the scene;

determining, by the processing device, a radiance of the scene based on the lighting conditions encoded within the Laplacian pyramid environment map structure;

generating, by the processing device, a synthesized image having a reconstruction of the scene using the radiance; and outputting, by the processing device, the synthesized image.

12. The method of claim 11, wherein the radiance comprises a first radiance and generating the synthesized image comprises:

determining, by the processing device, a second radiance from view-independent lighting effects of the scene determined from the plurality of digital images;

determining, by the processing device, a third radiance from view-dependent lighting effects of the scene determined from the plurality of digital images; and generating, by the processing device, the synthesized image having the reconstruction of the scene using at least one of the first radiance, the second radiance, or the third radiance.

13. The method of claim 11, further comprising:

rebalancing, by the processing device, the Laplacian pyramid environment map structure to fit the lighting conditions to a Laplacian pyramid.

14. The method of claim 11, further comprising:

accessing, by the processing device, the Laplacian pyramid environment map structure to determine the radiance by executing a multiple importance sampling algorithm.

15. A system comprising:

a memory component; and a processing device coupled to the memory component to perform operations including:

determining a view-independent radiance of a scene from a plurality of digital images that depict the scene from multiple perspectives;

supervising a diffuse radiance output for a reconstruction of the scene using the view-independent radiance;

determining a view-dependent radiance of the scene based on the plurality of digital images;

supervising a specular radiance output for the reconstruction using the view-independent radiance; and generating a synthesized image from the reconstruction using the diffuse radiance and the specular radiance.

16. The system of claim 15, wherein the operations further include:

generating a Laplacian pyramid environment map structure to encode lighting conditions used for generating the synthesized digital image.

17. The system of claim 16, wherein the operations further include:

retrieving an incidence illumination from the Laplacian pyramid environment map structure; and determining the diffuse radiance and the specular radiance based on the incidence illumination retrieved from the Laplacian pyramid environment map structure.

18. The system of claim 15, wherein the operations further include:

determining the view-independent radiance by executing a first neural radiance field that is overfit trained based on the digital images to determine the view-independent radiance; and determining the view-dependent radiance by executing a second neural radiance field that is overfit trained based on the digital images to determine the view-dependent radiance.

19. The system of claim 15, wherein the operations further include:

supervising the diffuse radiance and supervising the specular radiance by enabling a set of channels that couple the view-independent radiance with the diffuse radiance and that couple the view-dependent radiance with the specular radiance.

20. The system of claim 19, wherein the operations further include:

generating the synthesized image by disabling the set of channels to decouple the view-independent radiance from the diffuse radiance and the view-dependent radiance from the specular radiance.

* * * * *